(12) United States Patent
Jiang et al.

(10) Patent No.: US 10,444,573 B2
(45) Date of Patent: Oct. 15, 2019

(54) LIQUID CRYSTAL ARRAY SUBSTRATE, LIQUID CRYSTAL DISPLAY PANEL, AND LIQUID CRYSTAL DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Lei Guo, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/762,197

(22) PCT Filed: Apr. 1, 2017

(86) PCT No.: PCT/CN2017/079290
§ 371 (c)(1),
(2) Date: Mar. 22, 2018

(87) PCT Pub. No.: WO2018/176462
PCT Pub. Date: Oct. 4, 2018

(65) Prior Publication Data
US 2019/0072826 A1    Mar. 7, 2019

(51) Int. Cl.
*G02F 1/1343* (2006.01)
*G02F 1/1335* (2006.01)
(Continued)

(52) U.S. Cl.
CPC ...... *G02F 1/134336* (2013.01); *G02F 1/1368* (2013.01); *G02F 1/133514* (2013.01);
(Continued)

(58) Field of Classification Search
CPC ............. G02F 1/134336; G02F 1/1368; G02F 1/136286; G02F 1/134309;
(Continued)

(56) References Cited

U.S. PATENT DOCUMENTS

2012/0140153 A1   6/2012   Kawashima et al.
2017/0236474 A1   8/2017   Xu et al.

FOREIGN PATENT DOCUMENTS

CN    101165904 A    4/2008
CN    102213887 A    10/2011
(Continued)

OTHER PUBLICATIONS

International Search Report & Written Opinion dated Jan. 3, 2018, regarding PCT/CN2017/079290.

*Primary Examiner* — Selim U Ahmed
*Assistant Examiner* — Evan G Clinton
(74) *Attorney, Agent, or Firm* — Intellectual Valley Law, P.C.

(57) ABSTRACT

The present application discloses a liquid crystal array substrate having an array of a plurality of subpixel areas. The liquid crystal array substrate includes a plurality of first signal lines and a plurality of second signal lines crossing over each other; and a plurality of pixel electrodes corresponding to the plurality of subpixel areas, each of the plurality of subpixel areas including a single one of the plurality of pixel electrodes, and the single one of the plurality of pixel electrodes in each of the plurality of subpixel areas being an integral pixel electrode. Each of the plurality of subpixel areas includes a first subarea and a
(Continued)

second subarea having a substantially mirror symmetry with respect to a plane of mirror symmetry containing the one of the plurality of second signal lines in plan view of the array of the plurality of subpixel areas. The first subarea and the second subarea constitute an integral subpixel area.

17 Claims, 17 Drawing Sheets

(51) Int. Cl.
G02F 1/1337 (2006.01)
G02F 1/1362 (2006.01)
G02F 1/1368 (2006.01)

(52) U.S. Cl.
CPC .. *G02F 1/133707* (2013.01); *G02F 1/134309* (2013.01); *G02F 1/136286* (2013.01); *G02F 2001/134345* (2013.01); *G02F 2201/122* (2013.01); *G02F 2201/123* (2013.01)

(58) Field of Classification Search
CPC ......... G02F 1/133707; G02F 1/133514; G02F 2201/122; G02F 2201/123; G02F 2001/134345
See application file for complete search history.

(56) References Cited

FOREIGN PATENT DOCUMENTS

| | | |
|---|---|---|
| CN | 202285072 U | 6/2012 |
| CN | 202710885 U | 1/2013 |
| CN | 105137688 A | 12/2015 |
| CN | 105549280 A | 5/2016 |
| JP | 2002221730 A | 8/2002 |
| WO | 2017148153 A1 | 9/2017 |

LIQUID CRYSTAL ARRAY SUBSTRATE, LIQUID CRYSTAL DISPLAY PANEL, AND LIQUID CRYSTAL DISPLAY APPARATUS

CROSS-REFERENCE TO RELATED APPLICATION

This application is a national stage application under 35 U.S.C. § 371 of International Application No. PCT/CN2017/079290, filed Apr. 1, 2017, the contents of which are incorporated by reference in the entirety.

TECHNICAL FIELD

The present invention relates to display technology, more particularly, to a liquid crystal array substrate, a liquid crystal display panel, and a liquid crystal display apparatus.

BACKGROUND

A liquid crystal display apparatus includes an array substrate and a color filter substrate assembled together, and a liquid crystal layer between the array substrate and the color filter substrate. The liquid crystal layer includes liquid crystal molecules. A liquid crystal display apparatus produces an image by applying an electric field to a liquid crystal layer between the array substrate and the color filter substrate. In response to the electric field applied to the liquid crystal layer, the liquid crystal molecules in the liquid crystal layer rotate. Thus, the electric field changes an alignment direction of the liquid crystal molecules in the liquid crystal layer. Light transmittance of the liquid crystal layer is adjusted when the alignment direction of the liquid crystal molecules changes.

SUMMARY

In one aspect, the present invention provides a liquid crystal array substrate comprising an array of a plurality of subpixel areas, comprising a plurality of first signal lines and a plurality of second signal lines crossing over each other, and a plurality of pixel electrodes corresponding to the plurality of subpixel areas, each of the plurality of subpixel areas comprising a single one of the plurality of pixel electrodes, and the single one of the plurality of pixel electrodes in each of the plurality of subpixel areas being an integral pixel electrode; wherein each of the plurality of subpixel areas comprises a first subarea and a second subarea having a substantially mirror symmetry with respect to a plane of mirror symmetry containing one of the plurality of second signal lines in plan view of the array of the plurality of subpixel areas, and the first subarea and the second subarea constitute an integral subpixel area, the integral pixel electrode being controlled by a single switching thin film transistor.

Optionally, the integral pixel electrode comprises a plurality of domains having a substantially mirror symmetry with respect to the plane of mirror symmetry containing the one of the plurality of second signal lines in plan view of the array of a plurality of subpixel areas.

Optionally, the plurality of domains comprise a first domain and a second domain; and the integral pixel electrode comprises a plurality of first branches in the first domain and a plurality of second branches in the second domain, the plurality of first branches and the plurality of second branches having a substantially mirror symmetry with respect to the plane of mirror symmetry containing the one of the plurality of second signal lines in plan view of the array of a plurality of subpixel areas.

Optionally, the integral subpixel area has a substantially triangular shaped cross-section, a base of which abutting one of the plurality of first signal.

Optionally, the plurality of subpixel areas are grouped into a plurality of pairs of adjacent subpixel areas; and each of the plurality of pairs of adjacent subpixel areas comprises a first integral subpixel area and a second integral subpixel area having a substantially mirror symmetry with respect to a plane of mirror symmetry containing one of the plurality of first signal lines in plan view of the array of a plurality of subpixel areas.

Optionally, the plurality of pixel electrodes comprise a first integral pixel electrode in the first integral subpixel area and a second integral pixel electrode in the second integral subpixel area; a plurality of domains in the first integral pixel electrode have a substantially mirror symmetry with respect to the plane of mirror symmetry containing the one of the plurality of second signal lines in plan view of the array of a plurality of subpixel areas; a plurality of domains in the second integral pixel electrode have a substantially mirror symmetry with respect to the plane of mirror symmetry containing the one of the plurality of second signal lines in plan view of the array of a plurality of subpixel areas; and the plurality of domains in the first integral pixel electrode are substantially mirror symmetrical to the plurality of domains in the second integral pixel electrode with respect to one of the plurality first signal lines in plan view of the array of a plurality of subpixel areas.

Optionally, the plurality of domains in the first integral pixel electrode comprise a first domain and a second domain; the plurality of domains in the second integral pixel electrode comprise a third domain and a fourth domain; the first integral pixel electrode comprises a plurality of first branches in the first domain and a plurality of second branches in the second domain, the plurality of first branches and the plurality of second branches having a substantially mirror symmetry with respect to the plane of mirror symmetry containing the one of the plurality of second signal lines in plan view of the array of a plurality of subpixel areas; the second integral pixel electrode comprises a plurality of third branches in the third domain and a plurality of fourth branches in the fourth domain, the plurality of third branches and the plurality of fourth branches having a substantially mirror symmetry with respect to the plane of mirror symmetry containing the one of the plurality of second signal lines in plan view of the array of a plurality of subpixel areas; and the plurality of first branches and the plurality of second branches are substantially mirror symmetrical to the plurality of third branches and the plurality of fourth branches with respect to the one of the plurality of first signal lines in plan view of the array of a plurality of subpixel areas.

Optionally, each of the plurality of pairs of adjacent subpixel areas has a substantially parallelogram shape.

Optionally, the liquid crystal array substrate further comprises a plurality of switching thin film transistors, each of which in one of the plurality of subpixel areas; each of the plurality of pairs of adjacent subpixel areas comprises a first integral pixel electrode in the first integral subpixel area, a second integral pixel electrode in the second integral subpixel area, a first switching thin film transistor associated with the first integral pixel electrode, and a second switching thin film transistor associated with the second integral pixel electrode; the first switching thin film transistor has a structure which has a substantially mirror symmetry with respect to the plane of mirror symmetry containing the one of the plurality of second signal lines in plan view of the array of a plurality of subpixel areas; the second switching thin film transistor has a structure which has a substantially mirror symmetry with respect to the plane of mirror symmetry containing the one of the plurality of second signal lines in plan view of the array of a plurality of subpixel areas; a light transmission area in the first integral subpixel area has a substantially mirror symmetry with respect to the plane of mirror symmetry containing the one of the plurality of second signal lines in plan view of the array of a plurality of subpixel areas; and a light transmission area in the second integral subpixel area has a substantially mirror symmetry with respect to the plane of mirror symmetry containing the one of the plurality of second signal lines in plan view of the array of a plurality of subpixel areas.

Optionally, the plurality of first signal lines are a plurality of gate lines and the plurality of second signal lines are a plurality of data lines.

In another aspect, the present invention provides a liquid crystal display panel, comprising the liquid crystal array substrate described herein.

Optionally, the liquid crystal display panel further comprises a color filter substrate facing the liquid crystal array substrate; wherein the color filter substrate comprising an array of a plurality of color filter blocks, corresponding to the array of a plurality of subpixel areas in the liquid crystal array substrate; each of the plurality of color filter blocks comprises a first half and a second half having a substantially mirror symmetry with respect to the plane of mirror symmetry containing the one of the plurality of second signal lines in plan view of the array of the plurality of color filter blocks; and the first half and the second half constitute an integral color filter block, light emitted from which are of a substantially the same color.

Optionally, the integral color filter block has a substantially triangular shape; and a projection of a base of the substantially triangular shape on the color filter substrate abuts that of one of the plurality of first signal lines.

Optionally, the plurality of color filter blocks are grouped into a plurality of pairs of adjacent color filter blocks; and each of the plurality of pairs of adjacent color filter blocks comprises a first integral color filter block and a second integral color filter block having a substantially mirror symmetry with respect to a plane of mirror symmetry containing one of the plurality of first signal lines in plan view of the array of a plurality of color filter blocks.

Optionally, each of the plurality of pairs of adjacent color filter blocks has a substantially parallelogram shape.

Optionally, the first integral color filter block and the second integral color filter block in the substantially parallelogram shape are of a same color.

Optionally, the first integral color filter block and the second integral color filter block in the substantially parallelogram shape are of different colors.

Optionally, color filter blocks of a same color are consecutively along a direction substantially parallel to one of the plurality of second signal lines.

Optionally, the plurality of first signal lines extend substantially along a first signal line direction; the plurality of second signal lines extend substantially along a second signal line direction; and color filter blocks of a same color are consecutively along a direction substantially diagonal to the first signal line direction and the second signal line direction.

In another aspect, the present invention provides a liquid crystal display apparatus comprising a liquid crystal display panel described herein.

In another aspect, the present invention provides a liquid crystal array substrate comprising an array of a plurality of subpixel areas, comprising a plurality of pixel electrodes corresponding to the plurality of subpixel areas, each of the plurality of subpixel areas comprising a single one of the plurality of pixel electrodes, and the single one of the plurality of pixel electrodes in each of the plurality of subpixel areas being an integral pixel electrode; wherein each of the plurality of subpixel areas has a substantially isosceles triangular shaped cross-section having a substantially mirror symmetry with respect to an axis of mirror symmetry; and each of the plurality of subpixel areas comprises a first subarea and a second subarea having a substantially mirror symmetry with respect to the axis of mirror symmetry in plan view of the array of the plurality of subpixel areas; and the first subarea and the second subarea constitute an integral subpixel area, the integral pixel electrode being controlled by a single switching thin film transistor.

Optionally, the integral pixel electrode comprises a plurality of domains having a substantially mirror symmetry with respect to the axis of mirror symmetry in plan view of the array of a plurality of subpixel areas.

Optionally, the plurality of domains comprise a first domain and a second domain; and the integral pixel electrode comprises a plurality of first branches in the first domain and a plurality of second branches in the second domain, the plurality of first branches and the plurality of second branches having a substantially mirror symmetry with respect to the axis of mirror symmetry in plan view of the array of a plurality of subpixel areas.

Optionally, the plurality of subpixel areas are grouped into a plurality of pairs of adjacent subpixel areas; and each of the plurality of pairs of adjacent subpixel areas comprises a first integral subpixel area and a second integral subpixel area having a substantially mirror symmetry with respect to an interface between the first integral subpixel area and the second integral subpixel area in plan view of the array of a plurality of subpixel areas, the interface being substantially perpendicular to the axis of mirror symmetry.

Optionally, the plurality of pixel electrodes comprise a first integral pixel electrode in the first integral subpixel area and a second integral pixel electrode in the second integral subpixel area; a plurality of domains in the first integral pixel electrode have a substantially mirror symmetry with respect to the axis of mirror symmetry in plan view of the array of a plurality of subpixel areas; a plurality of domains in the second integral pixel electrode have a substantially mirror symmetry with respect to the axis of mirror symmetry in plan view of the array, of a plurality of subpixel areas; and the plurality of domains in the first integral pixel electrode are substantially mirror symmetrical to the plurality of domains in the second integral pixel electrode with respect to the interface in plan view of the array of a plurality of subpixel areas.

Optionally, the plurality of domains in the first integral pixel electrode comprise a first domain and a second domain; the plurality of domains in the second integral pixel electrode comprise a third domain and a fourth domain; the first integral pixel electrode comprises a plurality of first branches in the first domain and a plurality of second branches in the second domain, the plurality of first branches and the plurality of second branches having a substantially mirror symmetry with respect to the axis of mirror symmetry in plan view of the array of a plurality of subpixel areas; the second integral pixel electrode comprises a plurality of third branches in the third domain and a plurality of fourth branches in the fourth domain, the plurality of third branches and the plurality of fourth branches having a substantially mirror symmetry with respect to the axis of mirror symmetry in plan view of the array of a plurality of subpixel areas; and the plurality of first branches and the plurality of second branches are substantially mirror symmetrical to the plurality of third branches and the plurality of fourth branches with respect to the interface in plan view of the array of a plurality of subpixel areas.

Optionally, each of the plurality of pairs of adjacent subpixel areas has a substantially parallelogram shape.

Optionally, the liquid crystal array substrate further comprises a plurality of switching thin film transistors, each of which in one of the plurality of subpixel areas; each of the plurality of pairs of adjacent subpixel areas comprises a first integral pixel electrode in the first integral subpixel area, a second integral pixel electrode in the second integral subpixel area, a first switching thin film transistor associated with the first integral pixel electrode, and a second switching thin film transistor associated with the second integral pixel electrode; the first switching thin film transistor has a structure which has a substantially mirror symmetry with respect to the axis of mirror symmetry in plan view of the array of a plurality of subpixel areas; the second switching thin film transistor has a structure which has a substantially mirror symmetry with respect to the axis of mirror symmetry in plan view of the array of a plurality of subpixel areas; a light transmission area in the first integral subpixel area has a substantially mirror symmetry with respect to the axis of mirror symmetry in plan view of the array of a plurality of subpixel areas; and a light transmission area in the second integral subpixel area has a substantially mirror symmetry with respect to the axis of mirror symmetry in plan view of the array of a plurality of subpixel areas.

In another aspect, the present invention provides a liquid crystal display panel comprising the liquid crystal array substrate described herein.

Optionally, the liquid crystal display panel further comprises a color filter substrate facing the liquid crystal array substrate; wherein the color filter substrate comprising an array of a plurality of color filter blocks, corresponding to the array of a plurality of subpixel areas in the liquid crustal array substrate; each of the plurality of color filter blocks has a substantially isosceles triangular shape having a substantially mirror symmetry with respect to an axis of mirror symmetry; each of the plurality of color filter blocks comprises a first half and a second half having a substantially mirror symmetry with respect to the axis of mirror symmetry in plan view of the array of the plurality of color filter blocks; and the first half and the second half constitute an integral color filter block, light emitted from which are of a substantially the same color.

Optionally, the plurality of color filter blocks are grouped into a plurality of pairs of adjacent color filter blocks; and each of the plurality of pairs of adjacent color filter blocks comprises a first integral color filter block and a second integral color filter block having a substantially mirror symmetry with respect to an interface between the first integral color filter block and the second integral color filter block in plan view of the array of a plurality of color filter blocks, the interface being substantially perpendicular to the axis of mirror symmetry.

Optionally, each of the plurality of pairs of adjacent color filter blocks has a substantially parallelogram shape.

Optionally, the first integral color filter block and the second integral color filter block in the substantially parallelogram shape are of a same color.

Optionally, the first integral color filter block and the second integral color filter block in the substantially parallelogram shape are of different colors.

Optionally, color filter blocks of a same color are consecutively along a direction substantially parallel to the axis of mirror symmetry.

Optionally, color filter blocks of a same color are consecutively along a direction substantially parallel to a side of the substantially isosceles triangular shape.

In another aspect, the present invention provides a liquid crystal display apparatus comprising a liquid crystal display panel described herein.

In another aspect, the present invention provides a color filter substrate comprising an array of a plurality of color filter blocks; wherein each of the plurality of color filter blocks has a substantially isosceles triangular shape; the plurality of color filter blocks are grouped into a plurality of pairs of adjacent color filter blocks; and each of the plurality of pairs of adjacent color filter blocks has a substantially parallelogram shape.

Optionally, each of the plurality of pairs of adjacent color filter blocks in the substantially parallelogram shape are of a same color.

Optionally, each of the plurality of pairs of adjacent color filter blocks in the substantially parallelogram shape are of different colors.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
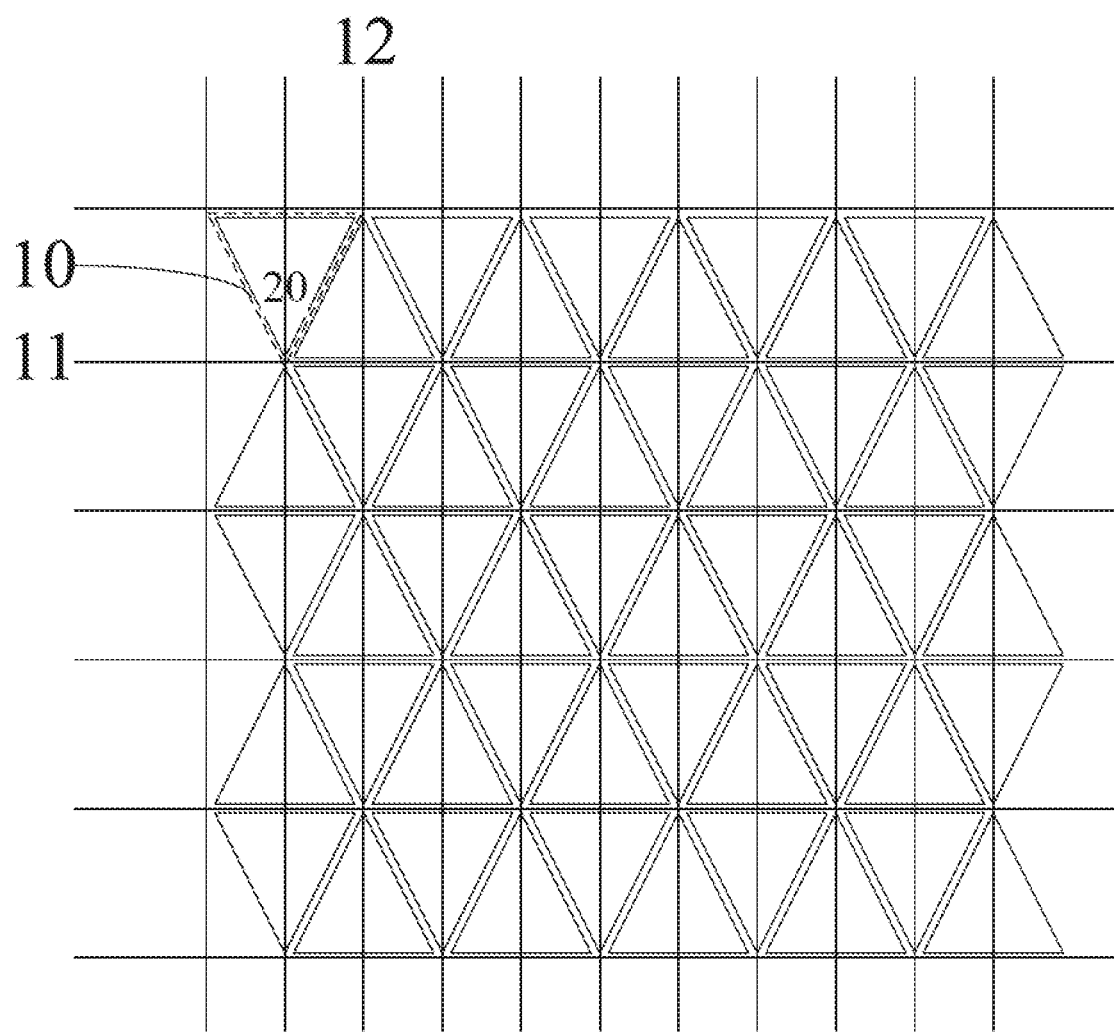
FIG. 1 is a schematic diagram illustrating the structure of a liquid crystal array substrate in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Liquid crystal molecules are birefringent, therefore they exhibit optical anisotropy. When a viewer views a liquid crystal display panel from different viewing angles, the viewer may observe different image display. For example, when the viewer views the display panel along a long axis of the liquid crystal molecules, a blue color shift occurs, and when the viewer views the display panel along a short axis of the liquid crystal molecules, a yellow color shift occurs.

In fringe field driven liquid crystal display panels, e.g., an in-plane switching liquid crystal display panel or a fringe field switching liquid crystal display panel, the pixel electrode is typically designed to having two domains, each domain includes a plurality of branches and a plurality of slits spaced apart from each other. The plurality of branches and the plurality of slits in different domains extend along different directions. When an electric field is applied to a liquid crystal layer, the liquid crystal molecules in different domains are re-aligned to different directions. For example, the alignment directions of the liquid crystal molecules in two domains may have a mirror symmetry with respect to a central axis of the pixel electrode. Thus, color shift occurred in two domains compensates each other to a certain degree, reducing the total color shift in the image display thereby enhancing display quality. Particularly, when a viewer views the display panel along a direction substantially parallel to the central axis of the pixel electrode, the color shift can be reduced.

However, color shift still exists in the conventional liquid crystal display panels when a viewer views the display panel along a direction not parallel to the central axis of the pixel electrode. For example, the color shift issue becomes, more severe when the viewer views the display panel along a direction substantially parallel to a short axis of liquid crystal molecules in one domain of the pixel electrode, but not aligned with a short axis of liquid crystal molecules in the other domain of the pixel electrode. The issue becomes more problematic when the viewer is viewing the display panel at a short distance, or is viewing a large-size display panel.

In some conventional liquid crystal display panels, two domains in the pixel electrode is arranged to be mirror symmetry to each other with respect to a gate line. When a viewer views the display panel along a data line, the color shift produced in each domain compensates each other due to the mirror symmetry between the two domains. However, when the viewer views the display panel along the gate line, there is no mirror symmetry between column of pixel electrodes (the column direction aligned with the data line direction). Color shift becomes noticeable, particularly when the viewer is viewing the display panel at a short distance, or is viewing a large-size display panel. For example, in a row of pixels, a first half of the row has a blue color shift, and a second half of the row has a yellow color shift.

Moreover, in conventional liquid crystal display panels, subpixels are arranged in stripes, for example, subpixels of a same color are arranged in a same column. The conventional subpixel arrangement often results in horizontal line defects and vertical line defect, leading to deteriorated display quality.

Accordingly, the present disclosure provides, inter alia, a liquid crystal array substrate, a liquid crystal display panel and a liquid crystal display apparatus having the same, and a color filter substrate that substantially obviate one or more of the problems due to limitations and disadvantages of the related art. In one aspect, the present disclosure provides a liquid crystal array substrate having an array of a plurality of subpixel areas. In some embodiments, the liquid crystal array substrate includes a plurality of first signal lines and a plurality of second signal lines crossing over each other; and a plurality of pixel electrodes corresponding to the plurality of subpixel areas, each of the plurality of subpixel areas including a single one of the plurality of pixel electrodes, and the single one of the plurality of pixel electrodes in each of the plurality of subpixel areas being an integral pixel electrode. The total number of pixel electrodes in each of the plurality of subpixel areas is one. Optionally, each of the plurality of subpixel areas includes a first subarea and a second subarea have a substantially mirror symmetry with respect to a plane of mirror symmetry containing the one of the plurality of second signal lines in plan view of the array of the plurality of subpixel areas. Optionally, the first subarea and the second subarea constitute an integral subpixel area, light emission in which is controlled by a single switching thin film transistor, e.g., the integral pixel electrode is controlled by a single switching thin film transistor. In some embodiments, the liquid crystal array substrate includes a plurality of pixel electrodes corresponding to the plurality of subpixel areas, each of the plurality of subpixel areas including a single one of the plurality of pixel electrodes, and the single one of the plurality of pixel electrodes in each of the plurality of subpixel areas being an integral pixel electrode. The total number of pixel electrodes in each of the plurality of subpixel areas is one. Optionally, each of the plurality of subpixel areas has a substantially isosceles triangular shaped cross-section having a substantially mirror symmetry with respect to an axis of mirror symmetry. Optionally, each of the plurality of subpixel areas includes a first subarea and a second subarea have a substantially mirror symmetry with respect to the axis of mirror symmetry in plan view of the array of the plurality of subpixel areas. Optionally, the first subarea and the second subarea constitute an integral subpixel area, light emission in which is controlled by a single switching thin film transistor, e.g., the integral pixel electrode is controlled by a single switching thin film transistor.

FIG. 1 is a schematic diagram illustrating the structure of a liquid crystal array substrate in some embodiments according to the present disclosure. Referring to FIG. 1, the liquid crystal array substrate in some embodiments includes an array of a plurality of subpixel areas 10 (the area encircled by the dotted line illustrates one of the plurality of subpixel areas 10). The liquid crystal array substrate includes a plurality of first signal lines 11 and a plurality of second signal lines 12 crossing over each other, and a plurality of pixel electrodes 20 corresponding to the plurality of subpixel areas 10. Each of the plurality of pixel electrodes 20 is in one of the plurality of subpixel areas 10. Each of the plurality of subpixel areas 10 includes a single one of the plurality of pixel electrodes 20. The total number of pixel electrodes in each of the plurality of subpixel areas 10 is one. Each of the plurality of pixel electrodes 20 in the one of the plurality of subpixel areas 10 is an integral pixel electrode.

In some embodiments, each of the second signal lines 12 crosses over a plurality of subpixel areas 10, e.g., along the column direction in FIG. 1. In some embodiments, each integral pixel electrode (i.e., each of the plurality of pixel electrodes 20) in each of the plurality of subpixel areas 10 includes a plurality of domains. Each of the second signal lines 12 in each of the plurality of subpixel areas 10 crosses over an integral pixel electrode therein. Optionally, each of the second signal lines 12 crosses over the plurality of subpixel areas 10 in regions corresponding to the borders between at least two of the plurality of domains in each integral pixel electrode. Because the borders between the plurality of domains are typically dark areas, by having each of the second signal lines 12 crossing over the plurality of subpixel areas 10 in these region, the aperture ratio of the display substrate is substantially unaffected.

Figure 2:
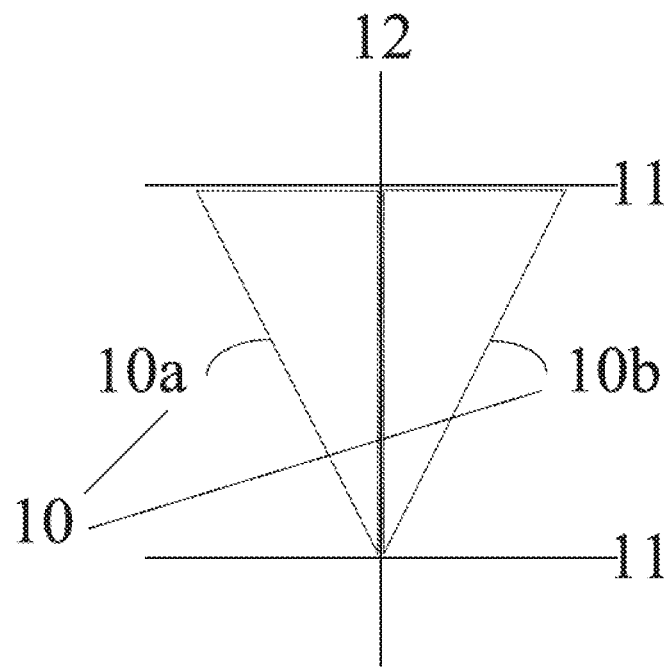
FIG. 2 is a schematic diagram illustrating the structure of a subpixel area in a liquid crystal array substrate in some embodiments according to the present disclosure.

FIG. 2 is a schematic diagram illustrating the structure of a subpixel area in a liquid crystal array substrate in some embodiments according to the present disclosure. Referring to FIG. 2, each of the plurality of subpixel areas 10 is crossed over by one of the plurality of second signal lines 12. Each of the plurality of subpixel areas 10 includes a first subarea 10a and a second subarea 10b of a substantially the same size. The first subarea 10a and the second subarea 10b have a substantially mirror symmetry with respect to a plane of mirror symmetry containing the one of the plurality of second signal lines 12 in plan view of the array of the plurality of subpixel areas 10. The first subarea 10a and the second subarea 10b constitute an integral subpixel area, light emission in which is controlled by a single switching thin film transistor, e.g., the integral pixel electrode is controlled by a single switching thin film transistor.

In some embodiments, each of the plurality of pixel electrodes 20 has a shape similar to that of each of the plurality of subpixel areas 10. Optionally, each of the second signal lines 12 crosses over a plurality of pixel electrodes 20, e.g., along the column direction in FIG. 1. Each of the plurality of pixel electrodes 20 is crossed over by one of the plurality of second signal lines 12. Each of the plurality of pixel electrodes 20 includes a first portion and a second portion of a substantially the same size. The first portion and the second portion have a substantially mirror symmetry with respect to the plane of mirror symmetry containing the one of the plurality of second signal lines 12 in plan view of the array of the plurality of subpixel areas 10.

In some embodiments, each of the plurality of pixel electrodes 20 may be made to have a plurality of domains. Optionally, each domain includes a plurality of branches (e.g., rod-shaped electrodes) extending along a substantially the same direction. The plurality of branches in each domain are spaced apart from each other, e.g., adjacent branches are spaced apart from each other by a slit. Optionally, the plurality of branches in each domain are substantially parallel to each other.

In some embodiments, each of the plurality of pixel electrodes 20 includes a plurality of domains. Optionally, the plurality of domains in each of the plurality of pixel electrodes 20 have a substantially mirror symmetry with respect to the plane of mirror symmetry containing the one of the plurality of second signal lines 12 in plan view of the array of a plurality of subpixel areas.

Figure 3:
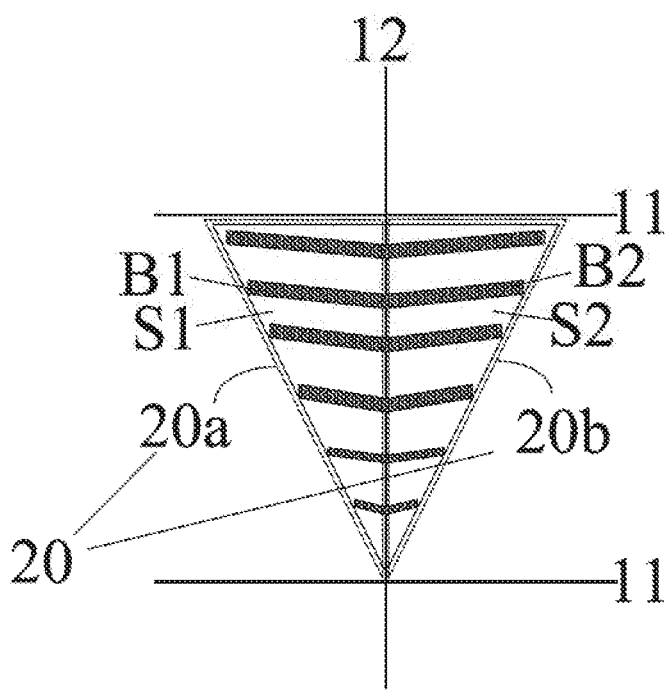
FIG. 3 is a schematic diagram illustrating the structure of a pixel electrode in a liquid crystal array substrate in some embodiments according to the present disclosure.

FIG. 3 is a schematic diagram illustrating the structure of a pixel electrode in a liquid crystal array substrate in some embodiments according to the present disclosure. Referring to FIG. 3, each of the plurality of pixel electrodes 20 in some embodiments includes a first domain 20a and a second domain 20b. The first domain 20a and the second domain 20b form an integral pixel electrode, e.g., the first domain 20a and the second domain 20b are not separated from each other but rather merely portions of an integral pixel electrode. Each of the plurality of pixel electrodes 20 includes a plurality of first branches B1 in the first domain 20a and a plurality of second branches 112 in the second domain 20b. As shown in FIG. 3, the plurality of first branches B1 and the plurality of second branches B2 have a substantially mirror symmetry with respect to the plane of mirror symmetry containing the one of the plurality of second signal lines 12 in plan view of the array of a plurality of subpixel areas. Optionally, the plurality of first branches B1 extend substantially along a first direction, and the plurality of second branches B2 extend substantially along a second direction, and the first direction being different from the second direction.

Referring to FIG. 3, each of the plurality of pixel electrodes 20 further includes a plurality of first slits S1 spacing apart a plurality of first branches B1 in the first domain 20a and a plurality of second slits S2 spacing apart a plurality of second branches B2 in the second domain 20b. As shown in FIG. 3, the plurality of first slits S1 and the plurality of second slits S2 have a substantially mirror symmetry with respect to the plane of mirror symmetry containing the one of the plurality of second signal hues 12 in plan view of the array of a plurality of subpixel areas. Optionally, the plurality of first slits S1 extend substantially along a first direction, and the plurality of second slits S2 extend substantially along a second direction, and the first direction being different from the second direction.

In some embodiments, each of the plurality of subpixel areas 10 has a substantially isosceles triangular shaped cross-section. Optionally, a base of the isosceles triangular shaped cross-section abuts one of the plurality of first signal lines 11.

In some embodiments, each of the plurality of pixel electrodes 20 has a substantially isosceles triangular shape. Optionally, a projection of a base of the substantially isosceles triangular shape on the liquid crystal array substrate abuts that of one of the plurality of first signal lines 11.

Figure 4:
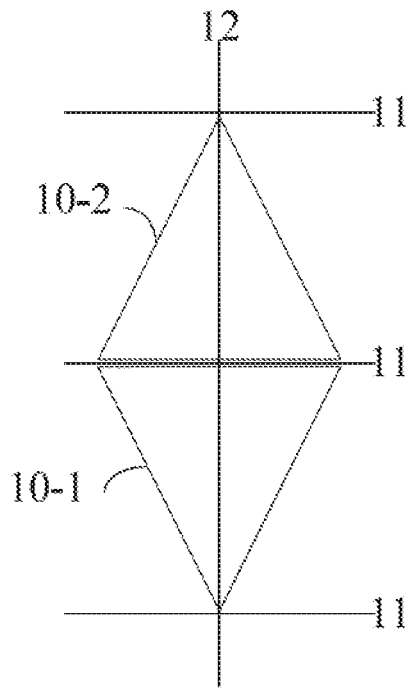
FIG. 4 is a schematic diagram illustrating the structure of a pair of adjacent subpixel areas in a liquid crystal array substrate in some embodiments according to the present disclosure.

In some embodiments, the plurality of subpixel areas 10 can be grouped into a plurality of pairs of adjacent subpixel areas. FIG. 4 is a schematic diagram illustrating the structure of a pair of adjacent subpixel areas in a liquid crystal array substrate in some embodiments according to the present disclosure. Referring to FIG. 4, each pair of adjacent subpixel areas in some embodiments includes a first integral subpixel area 10-1 and a second integral subpixel area 10-2. The first integral subpixel area 10-1 and the second integral subpixel area 10-2 have a substantially mirror symmetry with respect to a plane of mirror symmetry containing the one of the plurality of first signal lines 11 in plan view of the array of a plurality of subpixel areas. Optionally, as shown in FIG. 4, each pair of adjacent subpixel areas has a substantially parallelogram shape. Bases of the first integral subpixel area 10-1 and the second integral subpixel area 10-2 abut each other.

Figure 5:
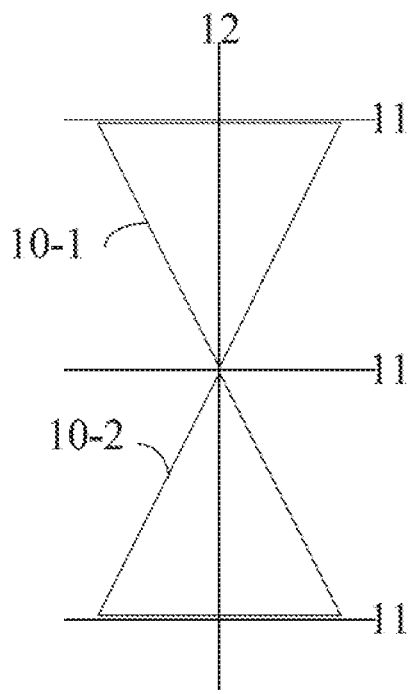
FIG. 5 is a schematic diagram illustrating the structure of a pair of adjacent subpixel areas in a liquid crystal array substrate in some embodiments according to the present disclosure.

Optionally, the plurality of subpixel areas 10 can be grouped a plurality of pairs of adjacent subpixel areas accordingly to a different arrangement. FIG. 5 is a schematic diagram illustrating the structure of a pair of adjacent subpixel areas in a liquid crystal array substrate in some embodiments according to the present disclosure. Referring to FIG. 5, the first integral subpixel area 10-1 is on top of the second integral subpixel area 10-2. Apexes of the first integral subpixel area 10-1 and the second integral subpixel area 10-2 abut each other. The first integral subpixel area 10-1 and the second integral subpixel area 10-2 have a substantially mirror symmetry with respect to the plane of mirror symmetry containing the one of the plurality of first signal lines 11 in plan view of the array of a plurality of subpixel areas.

Figure 6:
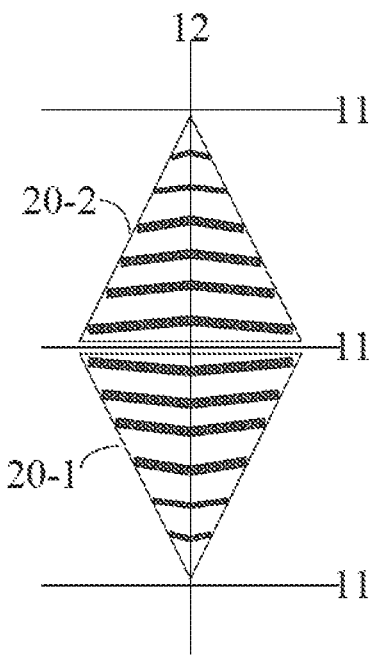
FIG. 6 is a schematic diagram illustrating the structure of a pair of adjacent pixel electrodes in a liquid crystal array substrate in some embodiments according to the present disclosure.

In some embodiments, the plurality of pixel electrodes 20 can be grouped into a plurality of pairs of adjacent pixel electrodes. FIG. 6 is a schematic diagram illustrating the structure of a pair of adjacent pixel electrodes in a liquid crystal array substrate in some embodiments according to the present disclosure. Referring to FIG. 6, each pair of adjacent pixel electrodes in some embodiments includes a first integral pixel electrode 20-1 and a second integral pixel electrode 20-2. The first integral pixel electrode 20-1 and the second integral pixel electrode 20-2 have a substantially mirror symmetry with respect to the plane of mirror symmetry containing the one of the plurality of first signal lines 11 in plan view of the array of a plurality of subpixel areas. Optionally, as shown in FIG. 6, each pair of adjacent pixel electrodes has a substantially parallelogram shape. Bases of the first integral pixel electrode 20-1 and the second integral pixel electrode 20-2 abut each other.

Figure 7:
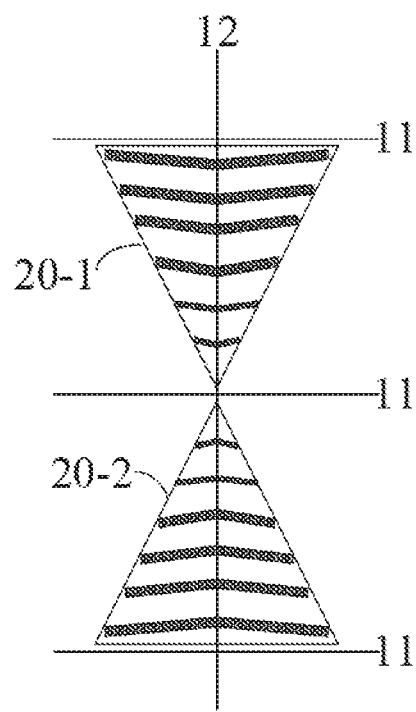
FIG. 7 is a schematic diagram illustrating the structure of a pair of adjacent pixel electrodes in a liquid crystal array substrate in some embodiments according to the present disclosure.

Optionally, the plurality of pixel electrodes 20 can be grouped a plurality of pairs of adjacent pixel electrodes accordingly to a different arrangement. FIG. 7 is a schematic diagram illustrating the structure of a pair of adjacent pixel electrodes in a liquid crystal array substrate in some embodiments according to the present disclosure. Referring to FIG. 7, the first integral pixel electrode 20-1 is on top of the second integral pixel electrode 20-2. Apexes of the first integral pixel electrode 20-1 and the second integral pixel electrode 20-2 abut each other. The first integral pixel electrode 20-1 and the second integral pixel electrode 20-2 have a substantially mirror symmetry with respect to the plane of mirror symmetry containing the one of the plurality of first signal lines 11 in plan view of the array of a plurality of subpixel areas.

Figure 8:
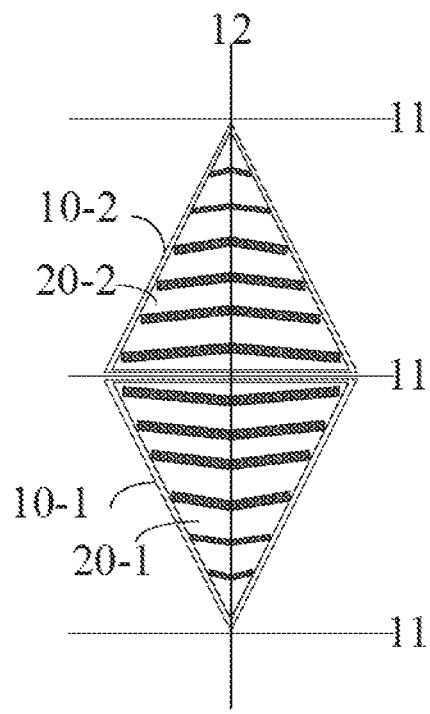
FIG. 8 is a schematic diagram illustrating the structure of a pair of adjacent pixel electrodes and a corresponding pair of adjacent subpixel areas in a liquid crystal array substrate in some embodiments according to the present disclosure.

FIG. 8 is a schematic diagram illustrating the structure of a pair of adjacent pixel electrodes and a corresponding pair of adjacent subpixel areas in a liquid crystal array substrate in some embodiments according to the present disclosure. Referring to FIG. 8, the plurality of pixel electrodes 20 include a first integral pixel electrode 20-1 in a first integral subpixel area 10-1 and a second integral pixel electrode 20-2 in a second integral subpixel area 10-2. In some embodiments, each of the first integral pixel electrode 20-1 and the second integral pixel electrode 20-2 are made to have a plurality of domains. Optionally, each domain includes a plurality of branches and a plurality of slits spaced apart from each other. Optionally, the plurality of branches in each domain are substantially parallel to each other. Optionally, the plurality of branches in an individual domain extend along a substantially the same direction. A plurality of domains in the first integral pixel electrode 20-1 have a substantially mirror symmetry with respect to the plane of mirror symmetry containing the one of the plurality of second signal lines 12 in plan view of the array of a plurality of subpixel areas. A plurality of domains in the second integral pixel electrode 20-2 have a substantially mirror symmetry with respect to the plane of mirror symmetry containing the one of the plurality of second signal lines 12 in plan view of the array of a plurality of subpixel areas. The plurality of domains in the first integral pixel electrode 20-1 are substantially mirror symmetrical to the plurality of domains in the second integral pixel electrode 20-2 with respect to one of the plurality of first signal lines 11 in plan view of the array of a plurality of subpixel areas.

Figure 9:
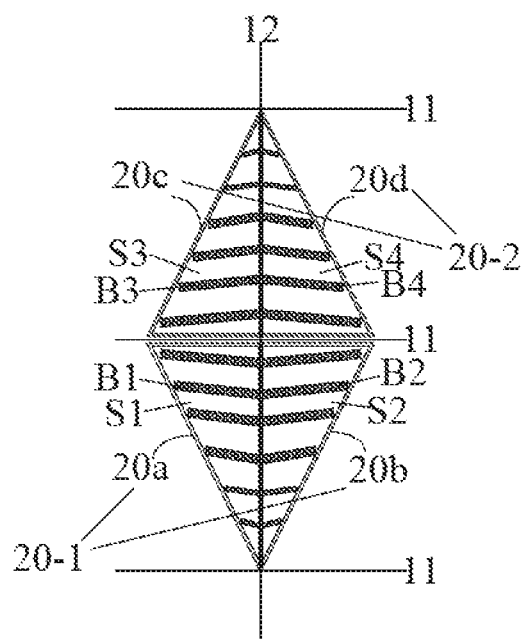
FIG. 9 is a schematic diagram illustrating the structure of a pair of adjacent pixel electrodes in a liquid crystal array substrate in some embodiments according to the present disclosure.

FIG. 9 is a schematic diagram illustrating the structure of a pair of adjacent pixel electrodes in a liquid crystal array substrate in some embodiments according to the present disclosure. Referring to FIG. 9, the pair of adjacent pixel electrodes includes a first integral pixel electrode 20-1 and a second integral pixel electrode 20-2. In some embodiments, the first integral pixel electrode 20-1 includes a first domain 20a and a second domain 20b, and the second integral pixel electrode 20-2 includes a third domain 20c and a fourth domain 20d. Optionally, the first integral pixel electrode 20-1 includes a plurality of first branches B1 in the first domain 20a and a plurality of second branches B2 in the second domain 20b. The plurality of first branches B1 and the plurality of second branches B2 have a substantially mirror symmetry with respect to the plane of mirror symmetry containing the one of the plurality of second signal lines 12 in plan view of the array of a plurality of subpixel areas. Optionally, the plurality of first branches B1 extend substantially along a first direction, the plurality of second branches B2 extend substantially along a second direction, and the first direction being different from the second direction. Optionally, the first integral pixel electrode 20-1 further includes a plurality of first slits S1 in the first domain 20a spacing apart the plurality of first branches B1; and further includes a plurality of second slits S2 spacing apart the plurality of second branches B2 in the second domain 20b. The plurality of first slits S1 and the plurality of second slits S2 have a substantially mirror symmetry with respect to the plane of mirror symmetry containing the one of the plurality of second signal lines 12 in plan view of the array of a plurality of subpixel areas. Optionally, the plurality of first slits S1 extend substantially along a first direction, the plurality of second slits S2 extend substantially along a second direction, and the first direction being different from the second direction.

Referring to FIG. 9, in some embodiments, the second integral pixel electrode 20-2 includes a plurality of third branches B3 in the third domain 20c and a plurality of fourth branches B4 in the fourth domain 20d. The plurality of third branches B3 and the plurality of fourth branches B4 have a substantially mirror symmetry with respect to the plane of mirror symmetry containing the one of the plurality of second signal lines 12 in plan view of the array of a plurality of subpixel areas. Optionally, the plurality of third branches B3 extend substantially along a third direction, the plurality of fourth braces B4 extend substantially along a fourth direction, and the third direction being different from the fourth direction. Optionally, the second integral pixel electrode 20-2 further includes a plurality of third slits S3 in the third domain 20c spacing apart the plurality of third branches B3; and further includes a plurality of fourth slits S4 spacing apart the plurality of fourth branches B4 in the fourth domain 20d. The plurality of third slits S3 and the plurality of fourth slits S4 have a substantially mirror symmetry with respect to the plane of mirror symmetry containing the one of the plurality of second signal lines 12 in plan view of the array of a plurality of subpixel areas. Optionally, the plurality of third slits S3 extend substantially along a third direction, the plurality of fourth slits S4 extend substantially along a fourth direction, and the third direction being different from the fourth direction.

Referring to FIG. 9, in some embodiments, a combination of the plurality of first branches B1 and the plurality of second branches B2 are substantially mirror symmetrical to a combination of the plurality of third branches B3 and the plurality of fourth branches B4 with respect to the one of the plurality of first signal lines 11 in plan view of the array of a plurality of subpixel areas. Optionally, the plurality of first branches B1 are substantially mirror symmetrical to the plurality of third branches B3 with respect to the one of the plurality of first signal lines 11 in plan view of the array of a plurality of subpixel areas; and the plurality of second branches B2 are substantially mirror symmetrical to the plurality of fourth branches B4 with respect to the one of the plurality of first signal lines 11 in plan view of the array of a plurality of subpixel areas. Optionally, the third direction is substantially parallel to the second direction. Optionally, the fourth direction is substantially parallel to the first direction.

In some embodiments, the plurality of first signal lines 11 are a plurality of gate lines and the plurality of second signal lines 12 are a plurality of data lines. In some embodiments, the plurality of first signal lines 11 are a plurality of data lines and the plurality of second signal lines 12 are a plurality of gate lines.

In a liquid crystal display panel having the present liquid crystal array substrate, a pair of adjacent subpixels constitutes a parallelogram. Pixel electrodes in a pair of adjacent subpixels have 4N domains (N is an integer ≥1) e.g., four domains, each of the adjacent subpixels has 2N domains, e.g., two domains. The 4N domains exhibit mirror symmetry with respect to a plane of mirror symmetry containing a gate line and with respect to a plane of mirror symmetry containing a data line. Accordingly, color shift in the 4N domain compensates each other no matter along which viewing angle the display panel is viewed. Moreover, unlike the subpixels in conventional liquid crystal display panels which are arranged in stripes, the subpixels in the present liquid crystal display panel are not made of a rectangular shape, and are made interleaving each other. The vertical line defects and horizontal line defects observed in the conventional liquid crystal display panel can be substantially reduced or eliminated.

Figure 10:
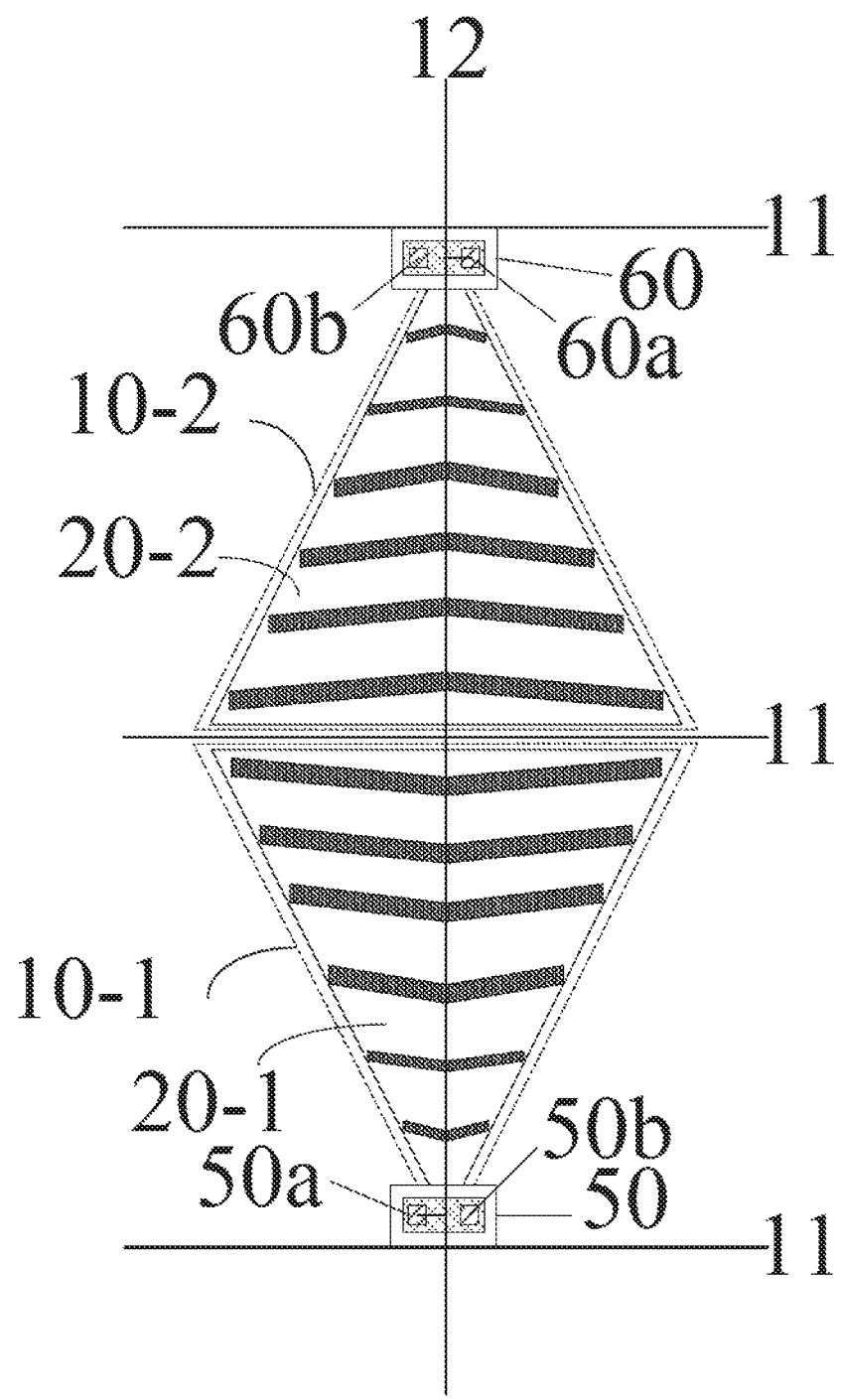
FIG. 10 is a schematic diagram illustrating arrangement of switching thin film transistors in a pair of adjacent subpixel areas in a liquid crystal array substrate in some embodiments according to the present disclosure.

In some embodiments, the liquid crystal array substrate further includes a plurality of switching thin film transistors, each of which in one of the plurality of subpixel areas. FIG. 10 is a schematic diagram illustrating arrangement of switching thin film transistors in a pair of adjacent subpixel areas in a liquid crystal array substrate in some embodiments according to the present disclosure. Each of the plurality of switching thin film transistors includes an active layer, a gate electrode connected to a gate line, a drain electrode connected to a pixel electrode, and a source electrode connected to a data line. Each of the plurality of switching thin film transistors is configured to control light emission in one of the plurality of subpixel areas. Referring to FIG. 10, the pair of adjacent subpixel areas in the liquid crystal array substrate includes a first integral pixel electrode 20-1 in the first integral subpixel area 10-1, a second integral pixel electrode 20-2 in the second integral subpixel area 10-2, a first switching thin film transistor 50 associated with the first integral pixel electrode 20-1, and a second switching thin film transistor 60 associated with the second integral pixel electrode 20-2. The first switching thin film transistor 50 includes a first source electrode 50a connected to one of the plurality of second signal lines 12 (e.g., in an example in which the second signal line is a data line), and a first drain electrode 50b connected to the first integral pixel electrode 20-1. The second switching thin film transistor 60 includes a second source electrode 60a connected to one of the plurality of second signal lines 12 (e.g., in an example in which the second signal line is a data line), and a second drain electrode 60b connected to the second integral pixel electrode 20-2. The first integral pixel electrode 20-1 and the second integral pixel electrode 20-2 have a substantially mirror symmetry with respect to a plane of mirror symmetry containing the one of the plurality of first signal lines 11 in plan view of the array of a plurality of subpixel areas. Optionally, each pair of adjacent pixel electrodes has a substantially parallelogram shape. Bases of the first integral pixel electrode 20-1 and the second integral pixel electrode 20-2 abut each other.

Figure 11:
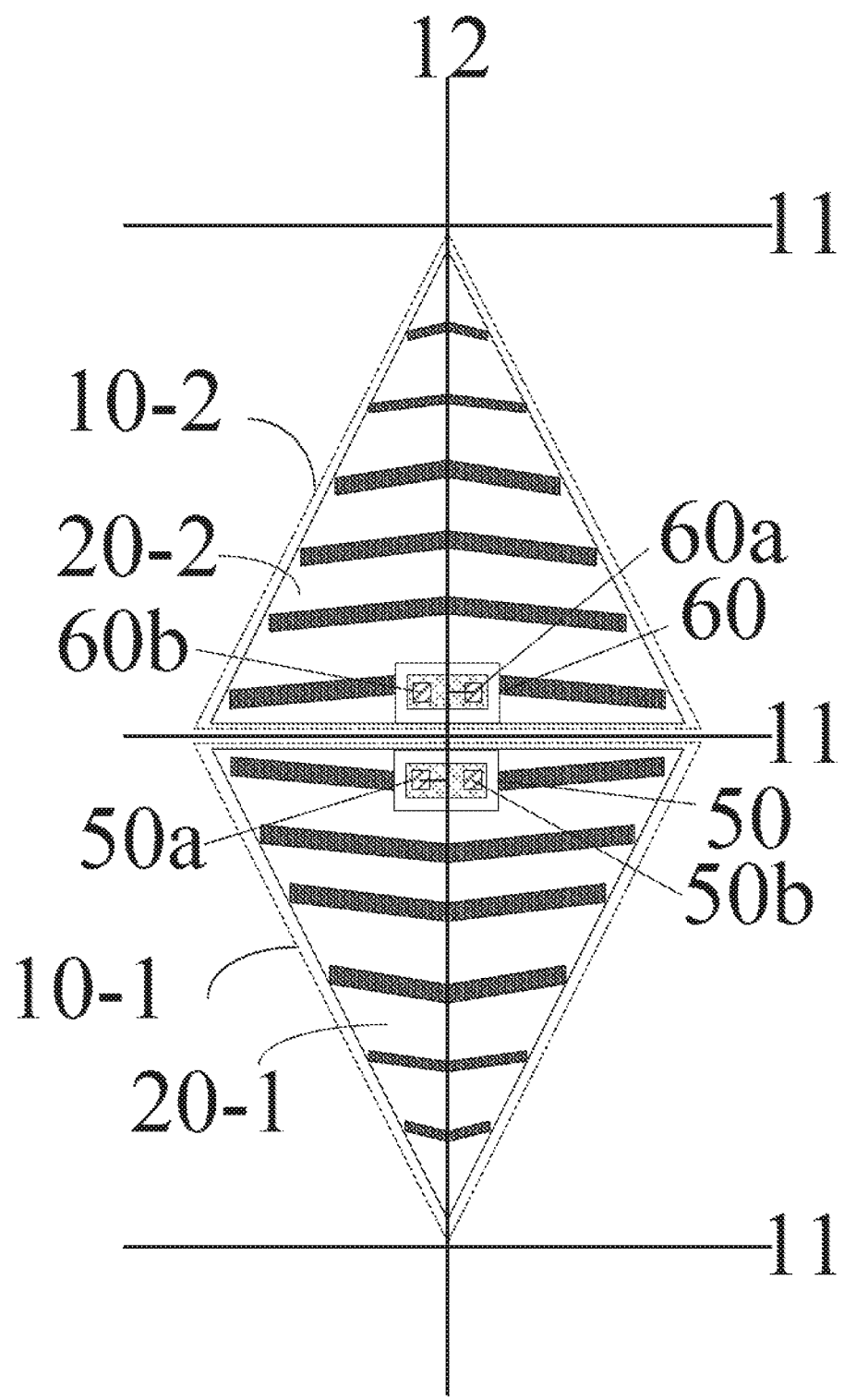
FIG. 11 is a schematic diagram illustrating arrangement of switching thin film transistors in a pair of adjacent subpixel areas in a liquid crystal array substrate in some embodiments according to the present disclosure.

Similarly, FIG. 11 is a schematic diagram illustrating arrangement of switching thin film transistors in a pair of adjacent subpixel areas in a liquid crystal array substrate in some embodiments according to the present disclosure. In FIG. 11, the first switching thin film transistor 50 is disposed in the middle of a base of the first integral subpixel area 10-1, and the second switching thin film transistor 60 is disposed in the middle of a base of the second integral subpixel area 10-2. In comparison, in FIG. 10, the first switching thin film transistor 50 is disposed an apex of the first integral subpixel area 10-1, and the second switching thin film transistor 60 is disposed an apex of the second integral subpixel area 10-2. Optionally, an aperture area (e.g., subpixel area other than an area occupied by the switching thin film transistor and metal lines) in the first integral subpixel area 10-1 has a substantially mirror symmetry with respect to the plane of mirror symmetry containing the one of the plurality of second signal lines 12 in plan view of the array of a plurality of subpixel areas, and an aperture area in the second integral subpixel area 10-2 has a substantially mirror symmetry with respect to the plane of mirror symmetry containing the one of the plurality of second signal lines 12 in plan view of the array of a plurality of subpixel areas. Optionally, a light transmission area in the first integral subpixel area 10-1 has a substantially mirror symmetry with respect to the plane of mirror symmetry containing the one of the plurality of second signal lines 12 in plan view of the array of a plurality of subpixel areas, and a light transmission area in the second integral subpixel area 10-2 has a substantially mirror symmetry with respect to the plane of mirror symmetry containing the one of the plurality of second signal lines 12 in plan view of the array of a plurality of subpixel areas. Optionally, the light transmission areas of the first integral subpixel area 10-1 and the second integral subpixel area 10-2 have a substantially mirror symmetry with respect to a plane of mirror symmetry containing the one of the plurality of first signal lines 11 in plan view of the array of a plurality of subpixel areas. Optionally, the aperture areas of the first integral subpixel area 10-1 and the second integral subpixel area 10-2 have a substantially mirror symmetry with respect to the plane of mirror symmetry containing the one of the plurality of first signal lines 11 in plan view of the array of a plurality of subpixel areas.

Optionally, the first switching thin film transistor 50 has a structure which has a substantially mirror symmetry with respect to the plane of mirror symmetry containing the one of the plurality of second signal lines 12 in plan view of the array of a plurality of subpixel areas. For example, the first source electrode 50a and the first drain electrode 50b have a substantially mirror symmetry with respect to the plane of mirror symmetry containing the one of the plurality of second signal lines 12 in plan view of the array of a plurality of subpixel areas. Optionally, the second switching thin film transistor 60 has a structure which has a substantially mirror symmetry with respect to the plane of mirror symmetry containing the one of the plurality of second signal lines 12 in plan view of the as of a plurality of subpixel areas. For example, the second source electrode 60a and the second drain electrode 60b have a substantially mirror symmetry with respect to the plane of mirror symmetry containing the one of the plurality of second signal lines 12 in plan view of the array of a plurality of subpixel areas. Optionally, the first switching thin film transistor 50 and the second switching thin film transistor 60 have a substantially mirror symmetry with respect to the plane of mirror symmetry containing the one of the plurality of first signal lines 11 plan view of the array of a plurality of subpixel areas.

Figure 12:
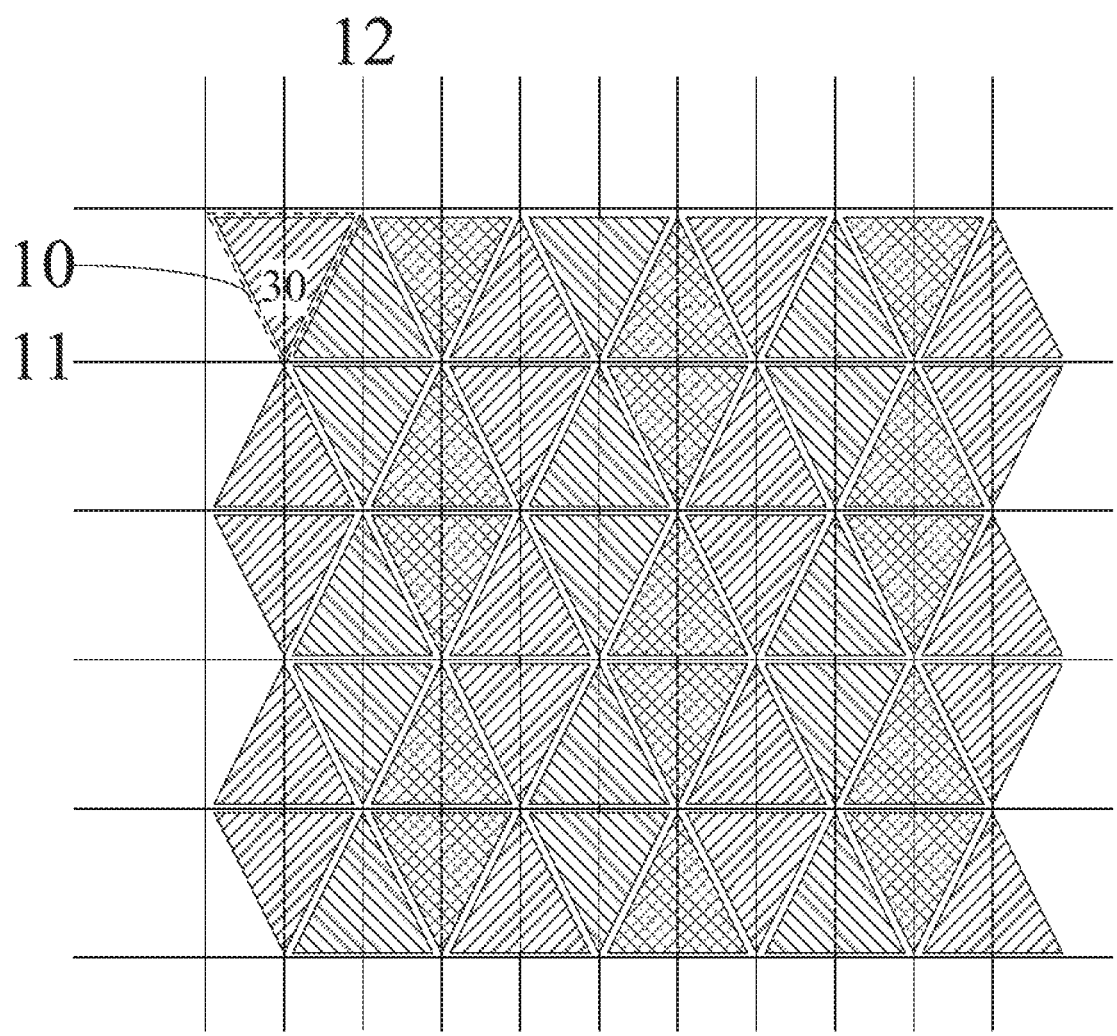
FIG. 12 is a schematic diagram illustrating the structure of a liquid crystal display panel in some embodiments according to the present disclosure.

In another aspect, the present disclosure provides a liquid crystal display panel having a liquid crystal array substrate described herein. Optionally, the liquid crystal display panel further includes a color filter substrate facing the liquid crystal array substrate. FIG. 12 is a schematic diagram illustrating the structure of a liquid crystal display panel in some embodiments according to the present disclosure. Referring to FIG. 12, the color filter substrate in some embodiments includes an array of a plurality of color filter blocks 30 corresponding to the array of a plurality of subpixel areas m the liquid crystal array substrate.

Figure 13:
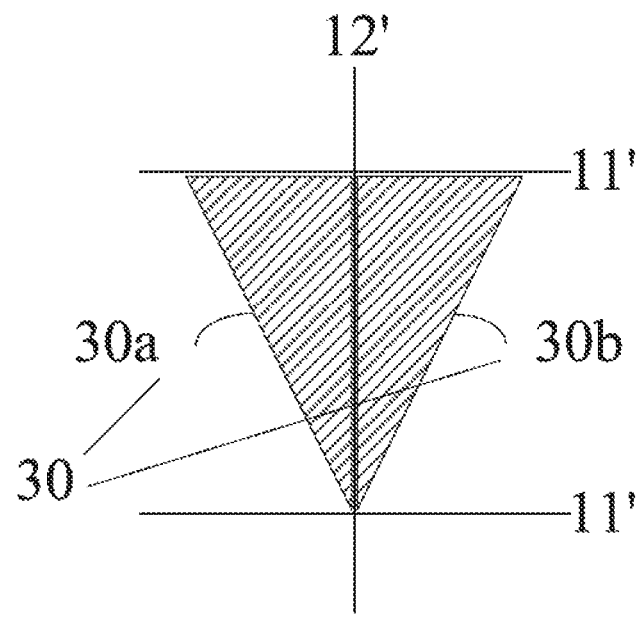
FIG. 13 is a schematic diagram illustrating projections of fist signal lines and a second signal line on a color filter block of a liquid crystal display panel in some embodiments according to the present disclosure.

In some embodiments, each of the second signal lines 12 crosses over a plurality of color filter blocks 30, e.g., along the column direction in FIG. 12. Each of the plurality of color filter blocks 30 includes a first half and a second half having a substantially mirror symmetry with respect to the plane of mirror symmetry containing the one of the plurality of second signal lines 12 in plan view of the array of the plurality of color filter blocks. As shown in FIG. 12, each of the plurality of color filter blocks 30 is crossed over by one of the plurality of second signal lines 12. FIG. 13 is a schematic diagram illustrating projections of fist signal lines and a second signal line on a color filter block of a liquid crystal display panel in some embodiments according to the present disclosure. FIG. 13 shows a projection 12' of the one of the plurality of second signal lines. Each of the plurality of color filter blocks 30 includes a first half 30a and a second half 30b of a substantially the same size. The first half 30a and the second half 30b have a substantially mirror symmetry with respect to the projection 12' of the one of the plurality of second signal lines in plan view of the array of the plurality of color filter blocks. The first half 30a and the second half 30b constitute an integral color filter block, light emitted from which are of a substantially the same color.

In some embodiments, each of the plurality of color filter blocks 30 has a substantially isosceles triangular shape. Optionally, a projection of a base of the isosceles triangular shape on the color filter substrate abuts that of one of the plurality of first signal lines 11.

Figure 14:
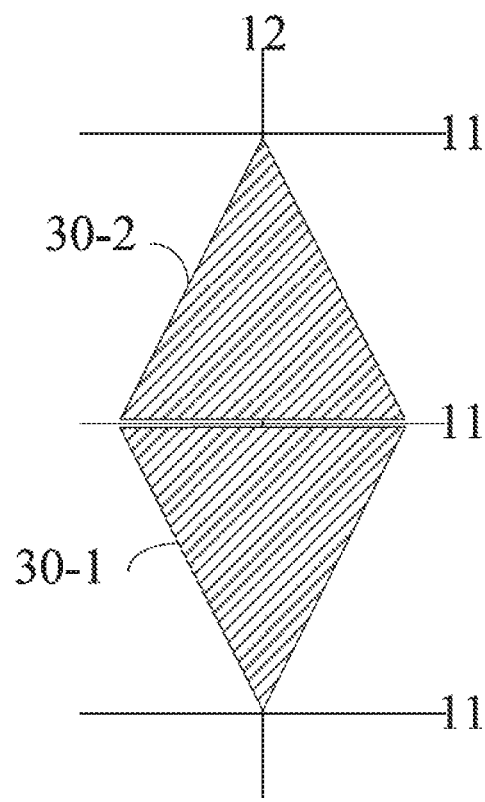
FIG. 14 is a schematic diagram illustrating the structure of a pair of color filter blocks in a liquid crystal display panel in some embodiments according to the present disclosure.

In some embodiments, the plurality of color filter blocks 30 can be grouped into a plurality of pairs of adjacent color filter blocks. FIG. 14 is a schematic diagram illustrating the structure of a pair of color filter blocks in a liquid crystal display panel in some embodiments according to the present disclosure. Referring to FIG. 14, each pair of adjacent color filter blocks in some embodiments includes a first integral color filter block 30-1 and a second integral color filter block 30-2. The first integral color filter block 30-1 and the second integral color filter block 30-2 have a substantially mirror symmetry with respect to the plane of mirror symmetry containing the one of the plurality of first signal lines 11 in plan view of the array of a plurality of color filter blocks. Optionally, as shown in FIG. 14, each pair of adjacent color filter blocks has a substantially parallelogram shape. Bases of the first integral color filter block 30-1 and the second integral color filter block 30-2 abut each other.

Figure 15:
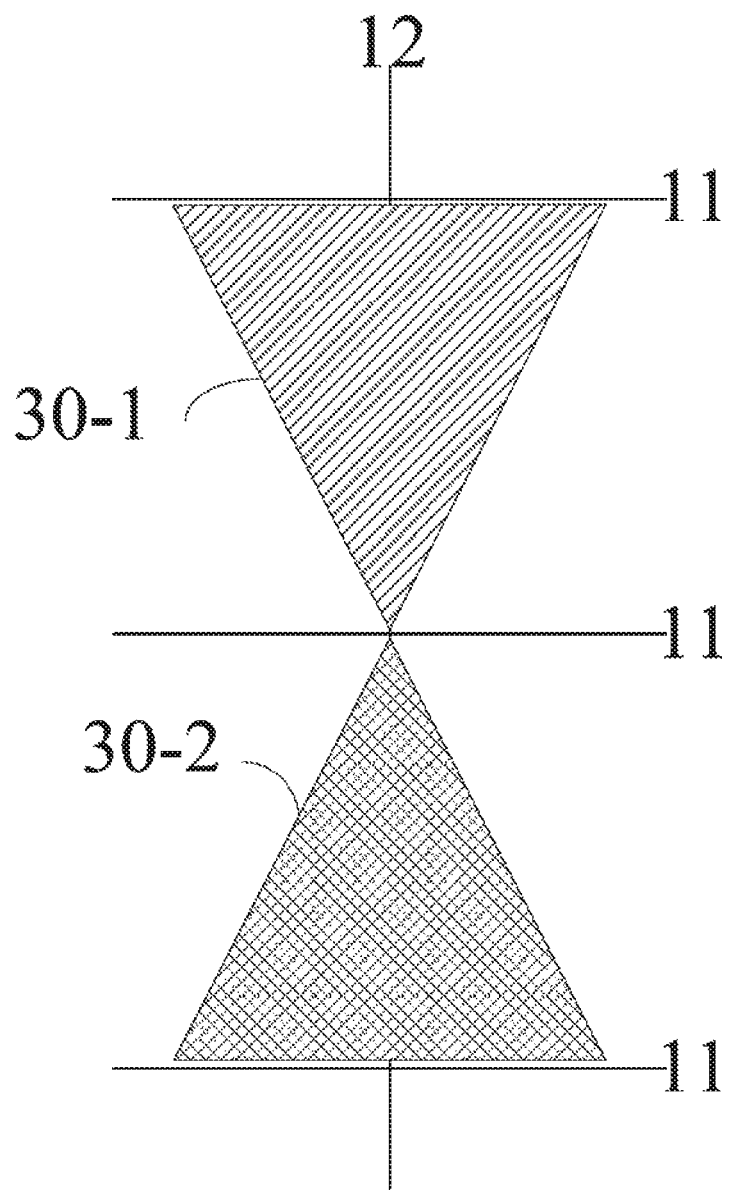
FIG. 15 is a schematic diagram illustrating the structure of a pair of color filter blocks in a liquid crystal display panel in some embodiments according to the present disclosure.

Optionally, the plurality of color filter blocks 30 can be grouped a plurality of pairs of adjacent color filter blocks accordingly to a different arrangement. FIG. 15 is a schematic diagram illustrating the structure of a pair of color filter blocks in a liquid crystal display panel in some embodiments according to the present disclosure. Referring to FIG. 15, the first integral color filter block 30-1 is on top of the second integral color filter block 30-2. Apexes of the first integral color filter block 30-1 and the second integral color filter block 30-2 abut each other. The first integral color filter block 30-1 and the second integral color filter block 30-2 have a substantially mirror symmetry with respect to a plane of mirror symmetry containing the one of the plurality of first signal lines 11 in plan view of the array of a plurality of color filter blocks.

Optionally, as shown in FIG. 14, the first integral color filter block 30-1 and the second integral color filter block 30-2 in the substantially parallelogram shape are of a same color.

Optionally, as shown in FIG. 15, the first integral color filter block 30-1 and the second integral color filter block 30-2 in the substantially parallelogram shape are of different colors.

In some embodiments, color filter blocks of a same color are consecutively arranged along a direction substantially parallel to one of the plurality of second signal lines 12. Referring to FIG. 12, the plurality of first signal lines 11 extend substantially along a first signal line direction (e.g., the row direction in FIG. 12), and the plurality of second signal lines 12 extend substantially along a second signal line direction the column direction in FIG. 12), and color filter blocks of a same color are consecutively arranged along the second signal line direction. Along the first signal line direction, color filter blocks of different colors are alternatedly arranged.

In one example, the liquid crystal display panel includes a plurality of pixels, each of which including at least three subpixels. The array of color filter blocks includes a plurality of color filter layers of different colors; each of the plurality of color filter layers having a plurality of color filter units of a same color. Optionally, each of the plurality of pixels includes at least three color filter units of different colors. Optionally, the at least three color filter units of different colors in a same pixel are consecutively arranged along the first signal line direction (as shown in FIG. 12). Optionally, a plurality of color filter units of a same color from different pixels are consecutively arranged in a same column along the second signal line direction as shown in FIG. 12).

Figure 16:
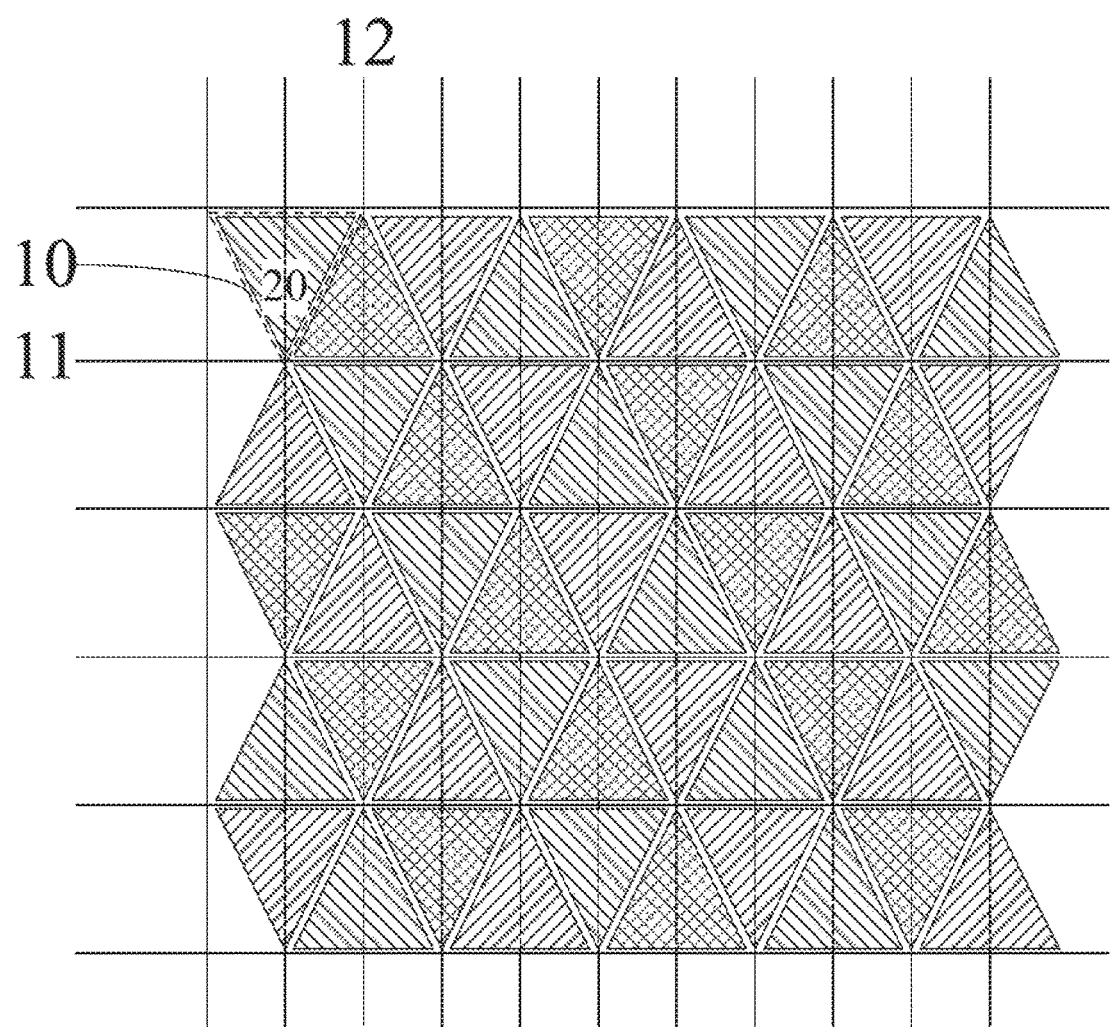
FIG. 16 is a schematic diagram illustrating the structure of a liquid crystal display panel in some embodiments according to the present disclosure.

FIG. 16 is a schematic diagram illustrating the structure of a liquid crystal display panel in some embodiments according to the present disclosure. Referring to FIG. 16, the plurality of first signal lines 11 extend substantially along a first signal line direction (e.g., the row direction in FIG. 16), and the plurality of second signal lines 12 extend substantially along a second signal line direction (e.g., the column direction in FIG. 16), and color filter blocks of a same color are consecutively arranged along a direction substantially diagonal to the first signal line direction and the second signal line direction. Along the first signal line direction, color filter blocks of different colors are alternatedly arranged. Along the second signal line direction, color filter blocks of different colors are alternatedly arranged.

In another example, the liquid crystal display panel includes a plurality of pixels, each of which including at least three subpixels. The array of color filter blocks includes a plurality of color filter layers of different colors; each of the plurality of color filter layers having a plurality of color filter units of a same color. Optionally, each of the plurality of pixels includes at least three color filter units of different colors. Optionally, the at least three color filter units of different colors in a same pixel are consecutively arranged along the first signal line direction (as shown in FIG. 16). Optionally, a plurality of color filter units of a same color from different pixels are consecutively arranged along the direction substantially diagonal to the first signal line direction and the second signal line direction (as shown in FIG. 16).

In some embodiments, the liquid crystal display panel is a fringe field driven liquid crystal display panel, in which the liquid crystal layer is driven by a fringe electric field. Examples of fringe field driven liquid crystal display panel include, but are not limited to, an advanced super-dimensional switching (ADS) liquid crystal display panel, an in-plane switch (IPS) liquid crystal display panel, and a fringe field switching (FFS) liquid crystal display panel.

In the present liquid crystal display panel, a pair of adjacent subpixels constitutes a parallelogram. Pixel electrodes in a pair of adjacent subpixels have 4N domains (N is an integer ≥1), e.g., four domains, each of the adjacent subpixels has 2N domains, e.g., two domains. The 4N domains exhibit mirror symmetry with respect to a plane of mirror symmetry containing a gate line and with respect to a plane of mirror symmetry containing a data line. Accordingly, color shift in the 4N domain compensates each other no matter along which viewing angle the display panel is viewed. Moreover, unlike the subpixels in conventional liquid crystal display panels which are arranged in stripes, the subpixels in the present liquid crystal display panel are not made of a rectangular shape, and are made interleaving each other. The vertical line defects and horizontal line defects observed in the conventional liquid crystal display panel can be substantially reduced or eliminated.

In some embodiments, the liquid crystal display panel further includes a plurality of switching thin film transistors, each of which in one of the plurality of subpixels. Each of the plurality of switching thin film transistors includes an active layer, a gate electrode connected to a gate line, a drain electrode connected to a pixel electrode, and a source electrode connected to a data line. Each of the plurality of switching thin film transistors is configured to control light emission in one of the plurality of subpixels. Optionally, a pan of adjacent subpixels (e.g., a first subpixel and a second subpixel) in the liquid crystal display panel includes a first integral pixel electrode in the first subpixel, a second integral pixel electrode in the second subpixel, a first switching thin film transistor associated with the first integral pixel electrode, and a second switching thin film transistor associated with the second integral pixel electrode. The first switching thin film transistor includes a first source electrode connected to one of the plurality of second signal lines (e.g., in an example in which the second signal line is a data line), and a first drain electrode connected to the first integral pixel electrode. The second switching thin film transistor includes a second source electrode connected to one of the plurality of second signal lines (e.g., in an example in which the second signal line is a data line), and a second drain electrode connected to the second integral pixel electrode. The first integral pixel electrode and the second integral pixel electrode have a substantially mirror symmetry with respect to a plane of mirror symmetry containing the one of the plurality of first signal lines in plan view of the array of a plurality of subpixels. Optionally, each pair of adjacent pixel electrodes has a substantially parallelogram shape. Bases of the first integral pixel electrode and the second integral pixel electrode abut each other.

In some embodiments, the first switching thin film transistor is disposed in the middle of a base of the first subpixel, and the second switching thin film transistor is disposed in the middle of a base of the second subpixel. In some embodiments, the first switching thin film transistor is disposed an apex of the first subpixel, and the second switching thin film transistor is disposed an apex of the second subpixel. Optionally, an aperture area (e.g., subpixel area other than an area occupied by the switching thin film transistor and metal lines) in the first subpixel has a substantially mirror symmetry with respect to the plane of mirror symmetry containing the one of the plurality of second signal lines in plan view of the array of a plurality of subpixels, and an aperture area in the second subpixel has a substantially mirror symmetry with respect to the plane of mirror symmetry containing the one of the plurality of second signal lines in plan view of the array of a plurality of subpixels. Optionally, a light transmission area in the first subpixel has a substantially mirror symmetry with respect to the plane of mirror symmetry containing the one of the plurality of second signal lines in plan view of the array of a plurality of subpixels, and a light transmission area in the second subpixel has a substantially mirror symmetry with respect to the plane of mirror symmetry containing the one of the plurality of second signal lines in plan view of the array of a plurality of subpixels. Optionally, the light transmission areas of the first subpixel and the second subpixel have a substantially mirror symmetry with respect to a plane of mirror symmetry containing the one of the plurality of first signal lines in plan view of the array of a plurality of subpixels. Optionally, the aperture areas of the first subpixel and the second subpixel have a substantially mirror symmetry with respect to the plane of mirror symmetry containing the one of the plurality of first signal lines in plan view of the array of a plurality of subpixels.

Optionally, the first switching thin film transistor has a structure which has a substantially mirror symmetry with respect to the plane of mirror symmetry containing the one of the plurality of second signal lines in plan view of the array of a plurality of subpixels. For example, the first source electrode and the first drain electrode have a substantially mirror symmetry with respect to the plane of mirror symmetry containing the one of the plurality of second signal lines in plan view of the array of a plurality of subpixels. Optionally, the second switching thin film transistor has a structure which has a substantially mirror symmetry with respect to the plane of mirror symmetry containing the one of the plurality of second signal lines in plan view of the array of a plurality of subpixels. For example, the second source electrode and the second drain electrode have a substantially mirror symmetry with respect to the plane of mirror symmetry containing the one of the plurality of second signal lines in plan view of the array of a plurality of subpixels. Optionally, the first switching thin film transistor and the second switching thin film transistor have a substantially mirror symmetry with respect to the plane of mirror symmetry containing the one of the plurality of first signal lines in plan view of the array of a plurality of subpixels.

Figure 17:
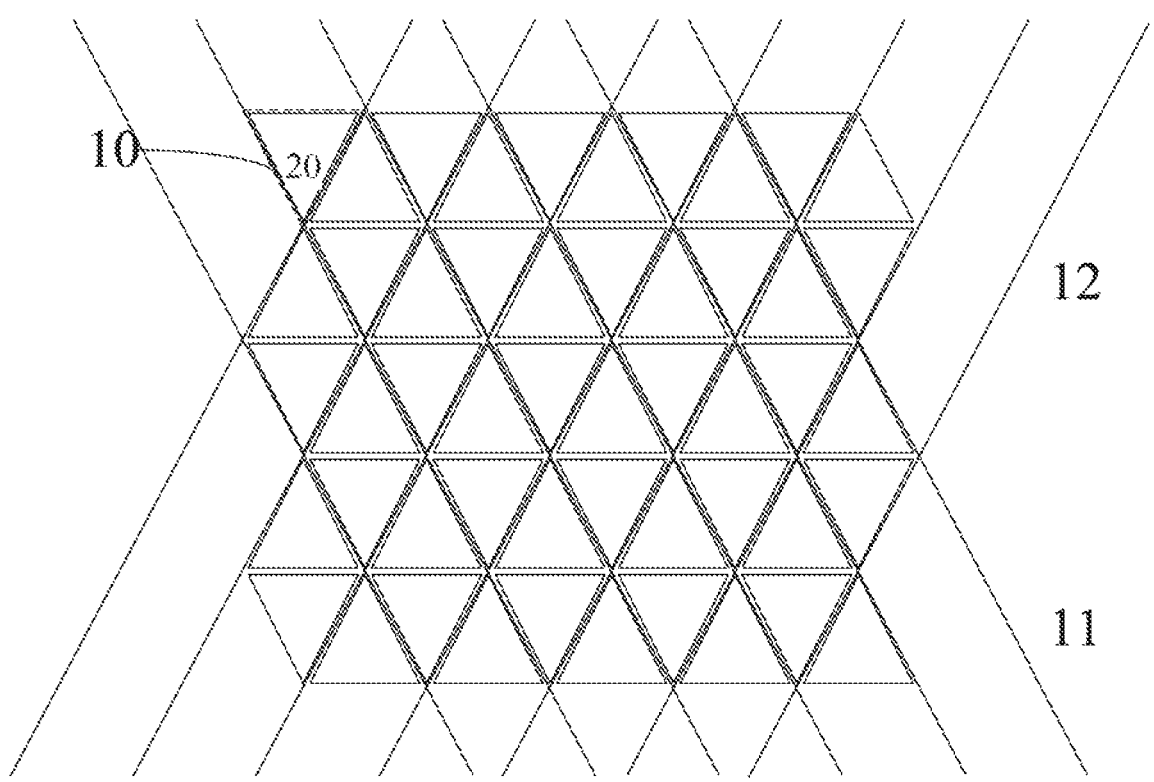
FIG. 17 is a schematic diagram illustrating the structure of a liquid crystal array substrate in some embodiments according to the present disclosure.

In another aspect, the present disclosure provides a liquid crystal array substrate including a plurality of subpixel areas each of which having a substantially isosceles triangular shaped cross-section. FIG. 17 is a schematic diagram illustrating the structure of a liquid crystal array substrate in some embodiments according to the present disclosure. Referring to FIG. 17, the liquid crystal array substrate in some embodiments includes an array of a plurality of subpixel areas 10 (the area encircled by the dotted line illustrates one of the plurality of subpixel areas 10). The liquid crystal array substrate includes a plurality of pixel electrodes 20 corresponding to the plurality of subpixel areas 10. Each of the plurality of pixel electrodes 20 is in one of the plurality of subpixel areas 10. Each of the plurality of subpixel areas 10 includes a single one of the plurality of pixel electrodes 20. The total number of pixel electrodes in each of the plurality of subpixel areas 10 is one. Each of the plurality of pixel electrodes 20 in the one of the plurality of subpixel areas 10 is an integral pixel electrode. Further, the liquid crystal array substrate includes a plurality of first signal lines 11 and a plurality of second signal lines 12 crossing over each other. Various signal line arrangements may be implemented in the present liquid crystal array substrate. Optionally, the plurality of first signal lines 11 and the plurality of second signal lines 12 cross over the plurality of subpixel areas (as shown in FIG. 1). Optionally, the plurality of first signal lines 11 and the plurality of second signal lines 12 do not cross over any subpixel areas (as shown in FIG. 1).

Figure 18:
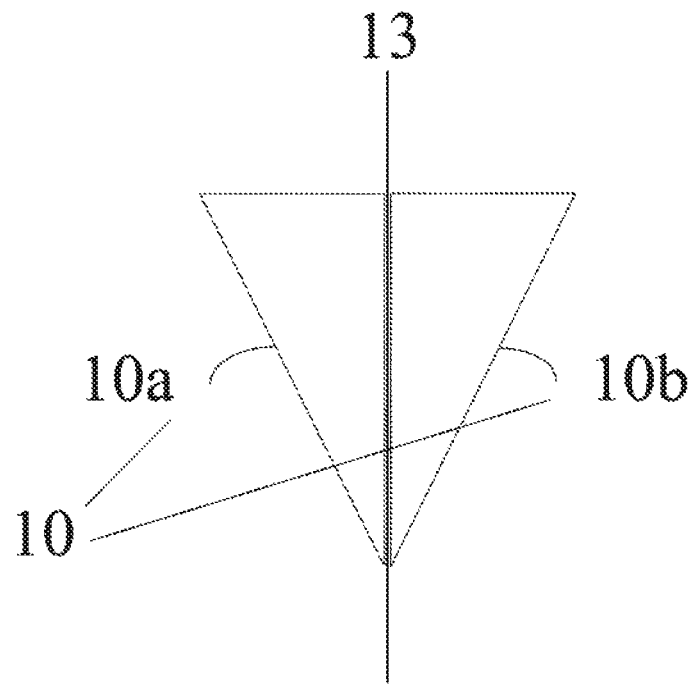
FIG. 18 is a schematic diagram illustrating the structure of a subpixel area in a liquid crystal array substrate in some embodiments according to the present disclosure.

FIG. 18 is a schematic diagram illustrating the structure of a subpixel area in a liquid crystal array substrate in some embodiments according to the present disclosure. Referring to FIG. 18, each of the plurality of subpixel areas 10 has a substantially isosceles triangular shaped cross-section. The substantially isosceles triangular shaped cross-section has a substantially mirror symmetry with respect to an axis of mirror symmetry 13. Each of the plurality of subpixel areas 10 includes a first subarea 10a and a second subarea 10b of a substantially the same size. The first subarea 10a and the second subarea 10b have a substantially mirror symmetry with respect to the axis of mirror symmetry 13 in plan view of the array of the plurality of subpixel areas 10. The first subarea 10a and the second subarea 10b constitute an integral subpixel area, light emission in which is controlled by a single switching thin film transistor, e.g., the integral pixel electrode is controlled by a single switching thin film transistor.

In some embodiments, each of the plurality of pixel electrodes 20 has a shape similar to that of each of the plurality of subpixel areas 10. Optionally, each of the plurality of pixel electrodes 20 includes a first portion and a second portion of a substantially the same size. The first portion and the second portion have a substantially mirror symmetry with respect to the axis of mirror symmetry 13 in plan view of the array of the plurality of subpixel areas 10.

In some embodiments, each of the plurality of pixel electrodes 20 includes a plurality of domains. Optionally, the plurality of domains in each of the plurality of pixel electrodes 20 have a substantially mirror symmetry with respect to the axis of mirror symmetry 13 in plan view of the array of a plurality of subpixel areas.

Figure 19:
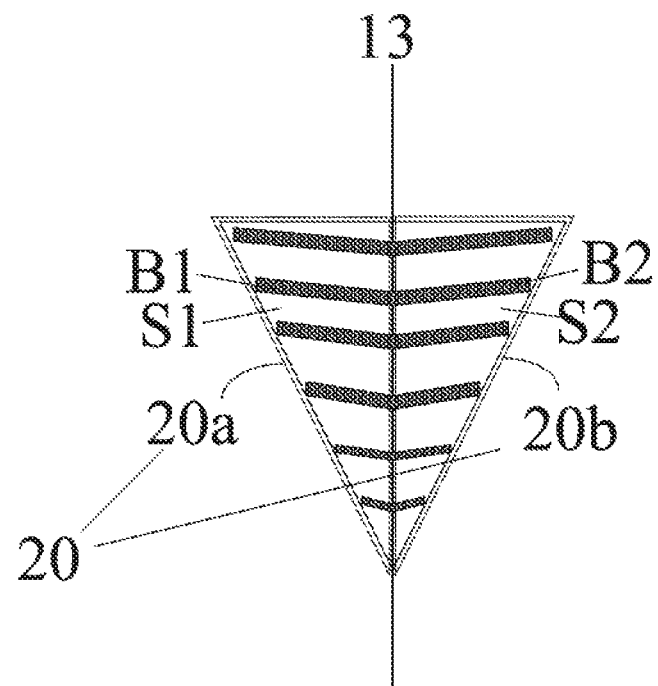
FIG. 19 is a schematic diagram illustrating the structure of a pixel electrode in a liquid crystal array substrate in some embodiments according to the present disclosure.

FIG. 19 is a schematic diagram illustrating the structure of a pixel electrode in a liquid crystal array substrate in some embodiments according to the present disclosure. Referring to FIG. 19, each of the plurality of pixel electrodes 20 in some embodiments includes a first domain 20a and a second domain 20b. The first domain 20a and the second domain 20b form an integral pixel electrode, e.g., the first domain 20a and the second domain 20b are not separated from each other but rather merely portions of an integral pixel electrode. Each of the plurality of pixel electrodes 20 includes a plurality of first branches B1 in the first domain 20a and a plurality of second branches B2 in the second domain 20b. As shown in FIG. 19, the plurality of first branches B1 and the plurality of second branches B2 have a substantially mirror symmetry with respect to the axis of mirror symmetry 13 in plan view of the array of a plurality of subpixel areas. Optionally, the plurality of first branches B1 extend substantially along a first direction, and the plurality of second branches B2 extend substantially along a second direction, and the first direction being different from the second direction.

Referring to FIG. 19, each of the plurality of pixel electrodes 20 further includes a plurality of first slits S1 spacing apart a plurality of first branches B1 in the first domain 20a and a plurality of second slits S2 spacing apart a plurality of second branches B2 in the second domain 20b. As shown in FIG. 19, the plurality of first slits S1 and the plurality of second slits S2 have a substantially mirror symmetry with respect to the axis of mirror symmetry 13 in plan view of the array of a plurality of subpixel areas. Optionally, the plurality of first slits S1 extend substantially along a first direction, and the plurality of second slits S2 extend substantially along a second direction, and the first direction being different from the second direction.

Figure 20:
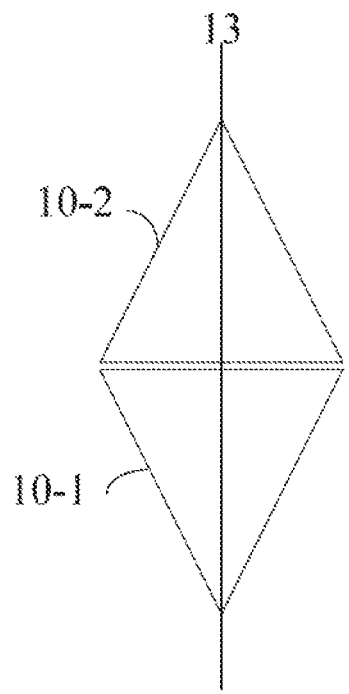
FIG. 20 is a schematic diagram illustrating the structure of a pair of adjacent subpixel areas in a liquid crystal array substrate in some embodiments according to the present disclosure.

In some embodiments, the plurality of subpixel areas 10 can be grouped into a plurality of pairs of adjacent subpixel areas. FIG. 20 is a schematic diagram illustrating the structure of a pair of adjacent subpixel areas in a liquid crystal array substrate in some embodiments according to the present disclosure. Referring to FIG. 20, each pair of adjacent subpixel areas in some embodiments includes a first integral subpixel area 10-1 and a second integral subpixel area 10-2. The first integral subpixel area 10-1 and the second integral subpixel area 10-2 have a substantially mirror symmetry with respect to the axis of mirror symmetry 13 in plan view of the array of a plurality of subpixel areas. Optionally, as shown in FIG. 20, each pair of adjacent subpixel areas has a substantially parallelogram shape. Bases of the first integral subpixel area 10-1 and the second integral subpixel area 10-2 abut each other.

Figure 21:
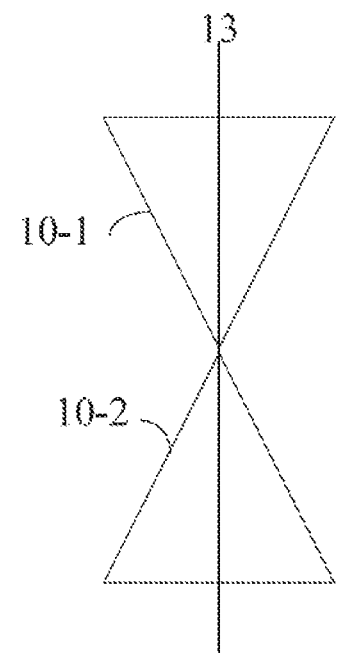
FIG. 21 is a schematic diagram illustrating the structure of a pair of adjacent subpixel areas in a liquid crystal array substrate in some embodiments according to the present disclosure.

Optionally, the plurality of subpixel areas 10 can be grouped a plurality of pairs of adjacent subpixel areas accordingly to a different arrangement. FIG. 21 is a schematic diagram illustrating the structure of a pair of adjacent subpixel areas in a liquid crystal array substrate in some embodiments according to the present disclosure. Referring to FIG. 21, the first integral subpixel area 10-1 is on top of the second integral subpixel area 10-2. Apexes of the first integral subpixel area 10-1 and the second integral subpixel area 10-2 abut each other. The first integral subpixel area 10-1 and the second integral subpixel area 10-2 have a substantially mirror symmetry with respect to the axis of mirror symmetry 13 in plan view of the array of a plurality of subpixel areas.

Figure 22:
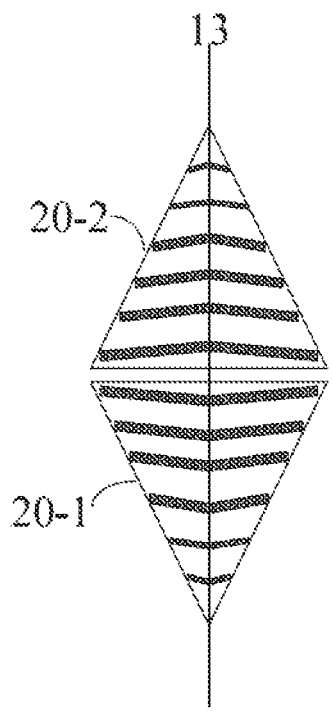
FIG. 22 is a schematic diagram illustrating the structure of a pair of adjacent pixel electrodes in a liquid crystal array substrate in some embodiments according to the present disclosure.

In some embodiments, the plurality of pixel electrodes 20 can be grouped into a plurality of pairs of adjacent pixel electrodes. FIG. 22 is a schematic diagram illustrating the structure of a pair of adjacent pixel electrodes in a liquid crystal array substrate in some embodiments according to the present disclosure. Referring to FIG. 22, each pair of adjacent pixel electrodes in some embodiments includes a first integral pixel electrode 20-1 and a second integral pixel electrode 20-2. The first integral pixel electrode 20-1 and the second integral pixel electrode 20-2 have a substantially manor symmetry with respect to the axis of mirror symmetry 13 in plan view of the array of a plurality of subpixel areas. Optionally, as shown in FIG. 22, each pair of adjacent pixel electrodes has a substantially parallelogram shape. Bases of the first integral pixel electrode 20-1 and the second integral pixel electrode 20-2 abut each other.

Figure 23:
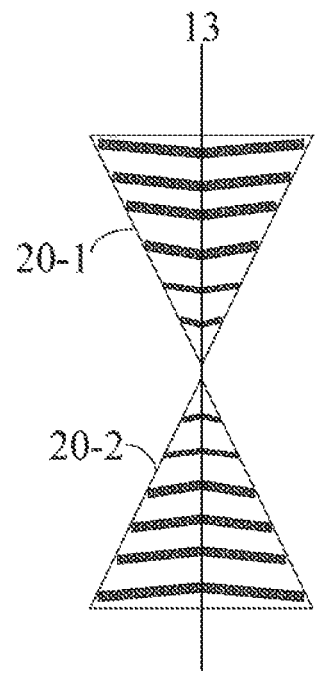
FIG. 23 is a schematic diagram illustrating the structure of a pair of adjacent pixel electrodes in a liquid crystal array substrate in some embodiments according to the present disclosure.

Optionally, the plurality of pixel electrodes 20 can be grouped a plurality of pairs of adjacent pixel electrodes accordingly to a different arrangement. FIG. 23 is a schematic diagram illustrating the structure of a pair of adjacent pixel electrodes in a liquid crystal array substrate in some embodiments according to the present disclosure. Referring to FIG. 23, the first integral pixel electrode 20-1 is on top of the second integral pixel electrode 20-2. Apexes of the first integral pixel electrode 20-1 and the second integral pixel electrode 20-2 abut each other. The first integral pixel electrode 20-1 and the second integral pixel electrode 20-2 have a substantially mirror symmetry with respect to the axis of mirror symmetry 13 in plan view of the array of a plurality of subpixel areas.

Figure 24:
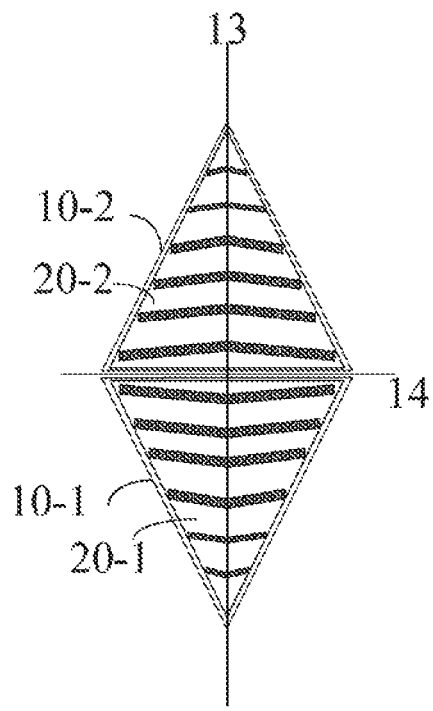
FIG. 24 is a schematic diagram illustrating the structure of a pair of adjacent pixel electrodes and a corresponding pair of adjacent subpixel areas in a liquid crystal array substrate in some embodiments according to the present disclosure.

FIG. 24 is a schematic diagram illustrating the structure of a pair of adjacent pixel electrodes and a corresponding pair of adjacent subpixel areas in a liquid crystal array substrate in some embodiments according to the present disclosure. Referring to FIG. 24, the plurality of pixel electrodes 20 include a first integral pixel electrode 20-1 in a first integral subpixel area 10-1 and a second integral pixel electrode 20-2 in a second integral subpixel area 10-2. In some embodiments, each of the first integral pixel electrode 20-1 and the second integral pixel electrode 20-2 are made to have a plurality of domains. Optionally, each domain includes a plurality of branches and a plurality of slits spaced apart from each other. Optionally, the plurality of branches in each domain are substantially parallel to each other. Optionally, the plurality of branches in an individual domain extend along a substantially the same direction. A plurality of domains a the first integral pixel electrode 20-1 have a substantially mirror symmetry with respect to the axis of mirror symmetry 13 in plan view of the array of a plurality of subpixel areas. A plurality of domains in the second integral pixel electrode 20-2 have a substantially mirror symmetry with respect to the axis of mirror symmetry 13 in plan view of the array of a plurality of subpixel areas. The plurality of domains in the first integral pixel electrode 204 are substantially mirror symmetrical to the plurality of domains in the second integral pixel electrode 20-2 with respect to an interface 14 between the first integral subpixel area and the second integral subpixel area (or between the first integral pixel electrode 20-1 and the second integral pixel electrode 20-2) in plan view of the array of a plurality of subpixel areas. As shown in FIG. 24, the interface 14 is substantially, perpendicular to the axis of mirror symmetry 13, and is located in a midpoint between the first integral pixel electrode 20-1 and the second integral pixel electrode 20-2.

Figure 25:
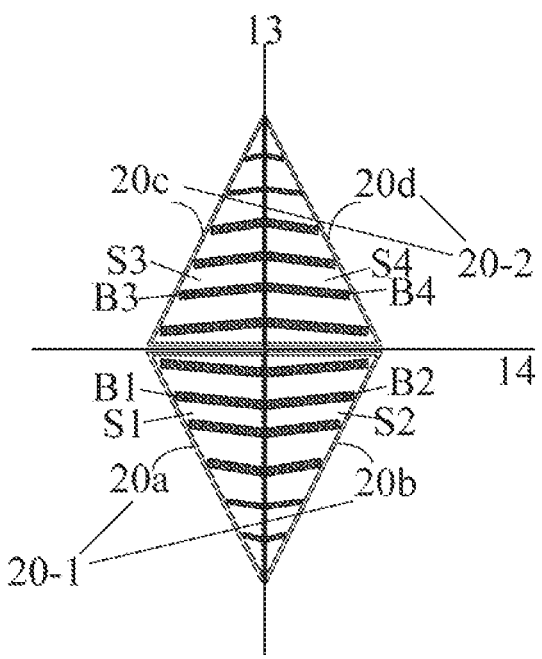
FIG. 25 is a schematic diagram illustrating the structure of a pair of adjacent pixel electrodes in a liquid crystal array substrate in some embodiments according to the present disclosure.

FIG. 25 is a schematic diagram illustrating the structure of a pair of adjacent pixel electrodes in a liquid crystal array substrate in some embodiments according to the present disclosure. Referring to FIG. 25, the pair of adjacent pixel electrodes includes a first integral pixel electrode 20-1 and a second integral pixel electrode 20-2. In some embodiments, the first integral pixel electrode 20-1 includes a first domain 20a and a second domain 20b, and the second integral pixel electrode 20-2 includes a third domain 20c and a fourth domain 20d. Optionally, the first integral pixel electrode 20-1 includes a plurality of first branches B1 in the first domain 20a and a plurality of second branches B2 in the second domain 20b. The plurality of first branches B1 and the plurality of second branches B2 have a substantially mirror symmetry with respect to the axis of mirror symmetry 13 in plan view of the array of a plurality of subpixel areas. Optionally, the plurality of first branches B1 extend substantially along a first direction, the plurality of second branches B2 extend substantially along a second direction, and the first direction being different from the second direction. Optionally, the first integral pixel electrode 20-1 further includes a plurality of first slits S1 in the first domain 20a spacing apart the plurality of first branches B1; and further includes a plurality of second slits S2 spacing apart the plurality of second branches B2 in the second domain 20b. The plurality of first slits S1 and the plurality of second slits S2 have a substantially mirror symmetry with respect to the axis of mirror symmetry 13 in plan view of the array of a plurality of subpixel areas. Optionally, the plurality of first slits S1 extend substantially along a first direction, the plurality of second slits S2 extend substantially along a second direction, and the first direction being different from the second direction.

Referring to FIG. 25, in some embodiments, the second integral pixel electrode 20-2 includes a plurality of third branches B3 in the third domain 20c and a plurality of fourth branches B4 in the fourth domain 20d. The plurality of third branches B3 and the plurality of fourth branches B4 have a substantially mirror symmetry with respect to the axis of mirror symmetry 11 in plan view of the array of a plurality of subpixel areas. Optionally, the plurality of third blanches B3 extend substantially along a third direction, the plurality of fourth branches B4 extend substantially along a fourth direction, and the third direction being different from the fourth direction. Optionally, the second integral pixel electrode 20-2 further includes a plurality of third slits S3 in the third domain 20c spacing apart the plurality of third branches B3; and farther includes a plurality of fourth slits S4 spacing apart the plurality of fourth branches B4 in the fourth domain 20d. The plurality of third slits S3 and the plurality of fourth slits S4 have a substantially mirror symmetry with respect to the axis of mirror symmetry 13 in plan view of the array of a plurality of subpixel areas. Optionally, the plurality of third slits S3 extend substantially along a third direction, the plurality of fourth slits S4 extend substantially along a fourth direction, and the third direction being different from the fourth direction.

Referring to FIG. 25, in some embodiments, a combination of the plurality of first branches B1 and the plurality of second branches B2 are substantially mirror symmetrical to a combination of the plurality of third branches B3 and the plurality of fourth branches B4 with respect to the interface 14 between the first integral subpixel area and the second integral subpixel area in plan view of the array of a plurality of subpixel areas. Optionally, the plurality of first branches B1 are substantially mirror symmetrical to the plurality of third branches B3 with respect to the interface 14 between the first integral subpixel area and the second integral subpixel area in plan view of the array of a plurality of subpixel areas; and the plurality of second branches B2 are substantially mirror symmetrical to the plurality of fourth branches B4 with respect to the interface 14 between the first integral subpixel area and the second integral subpixel area in plan view of the array of a plurality of subpixel areas. Optionally, the third direction is substantially parallel to the second direction. Optionally, the fourth direction is substantially parallel to the first direction.

In a liquid crystal display panel having the present liquid crystal array substrate, a pair of adjacent subpixels constitutes a parallelogram. Pixel electrodes in a pair of adjacent subpixels have 4N domains (N is an integer ≥1), e.g., four domains, each of the adjacent subpixels has 2N domains, e.g., two domains. The 4N domains exhibit mirror symmetry with respect to an axis of mirror symmetry of the subpixel and with respect to an interface between adjacent subpixels in the pair. Accordingly, color shift in the 4N domain compensates each other no matter along which viewing angle the display panel is viewed. Moreover, unlike the subpixels in conventional liquid crystal display panels which are arranged in stripes, the subpixels in the present liquid crystal display panel are not made of a rectangular shape, and are made interleaving each other. The vertical line defects and horizontal line defects observed in the conventional liquid crystal display panel can be substantially reduced or eliminated.

Figure 26:
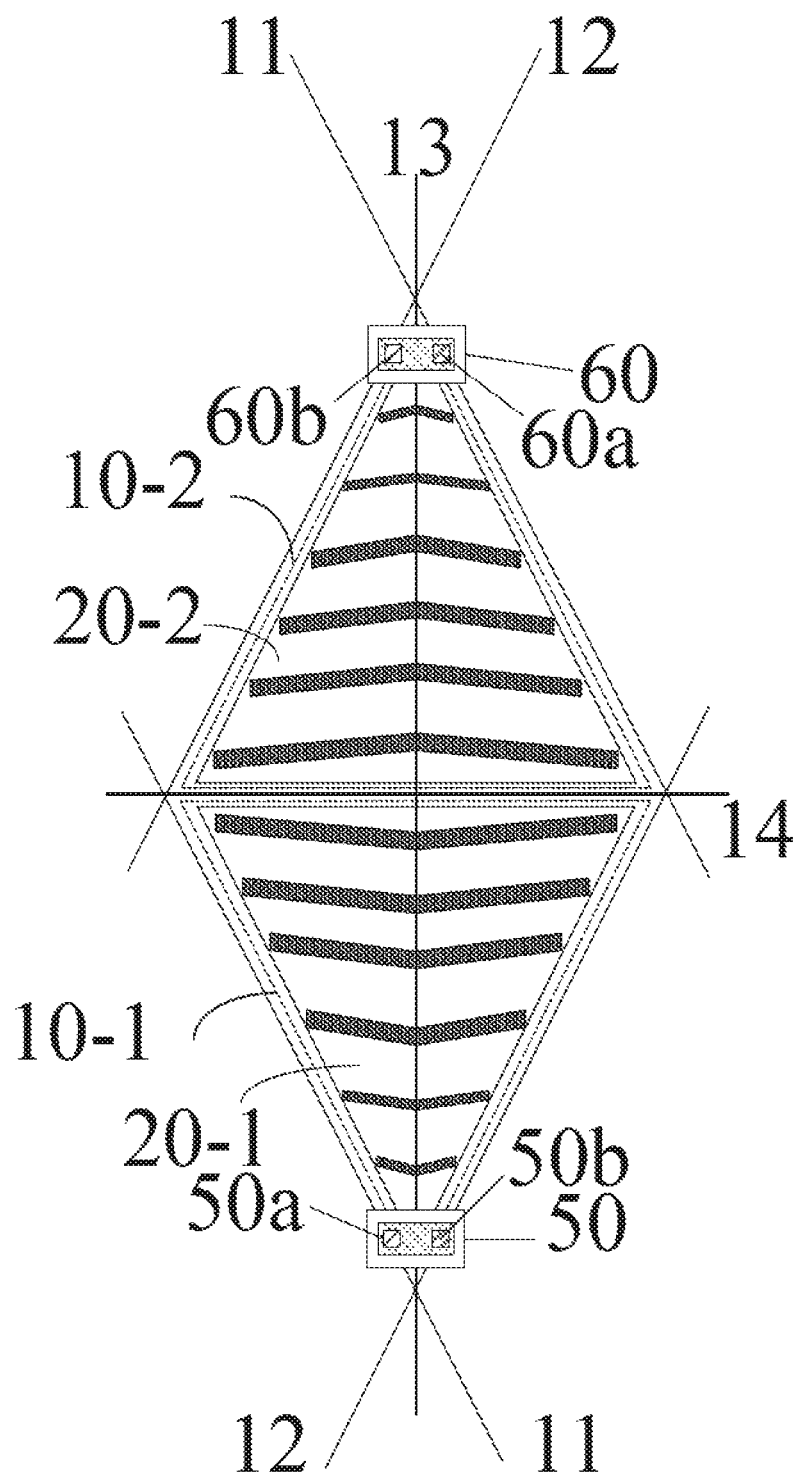
FIG. 26 is a schematic diagram illustrating arrangement of switching thin film transistors in a pair of adjacent subpixel areas in a liquid crystal array substrate in same embodiments according to the present disclosure.

In some embodiments, the liquid crystal array substrate thither includes a plurality of switching thin film transistors, each of which in one of the plurality of subpixel areas. FIG. 26 is a schematic diagram illustrating arrangement of switching thin film transistors in a pair of adjacent subpixel areas in a liquid crystal array substrate in some embodiments according to the present disclosure. Each of the plurality of switching thin film transistors includes an active layer, a gate electrode connected to a gate line, a drain electrode connected to a pixel electrode, and a source electrode connected to a data line. Each of the plurality of switching thin film transistors is configured to control light emission in one of the plurality of subpixel areas. Referring to FIG. 26, the pair of adjacent subpixel areas in the liquid crystal array substrate includes a first integral pixel electrode 20-1 in the first integral subpixel area 10-1, a second integral pixel electrode 20-2 in the second integral subpixel area 10-2, a first switching thin film transistor 50 associated with the first integral pixel electrode 20-1, and a second switching thin film transistor 60 associated with the second integral pixel electrode 20-2. The first switching thin film transistor 50 includes a first source electrode 50a connected to one of the plurality of second signal lines 12 (e.g., in an example in which the second signal line is a data line), and a first drain electrode 50b connected to the first integral pixel electrode 20-1. The second switching thin film transistor 60 includes a second source electrode 50a connected to one of the plurality of second signal lines 12 (e.g., in an example in which the second signal line is a data line), and a second drain electrode 60b connected to the second integral pixel electrode 20-2. The first integral pixel electrode 20-1 and the second integral pixel electrode 20-2 have a substantially mirror symmetry with respect to the interface 14 between the first integral subpixel area 10-1 and the second integral subpixel area 10-2 in plan view of the array of a plurality of subpixel areas. Optionally, each pair of adjacent pixel electrodes has a substantially parallelogram shape. Bases of the first integral pixel electrode 20-1 and the second integral pixel electrode 20-2 abut each other.

In some embodiments, as shown in FIG. 26, the first switching thin film transistor 50 is disposed an apex of the first integral subpixel area 10-1, and the second switching thin film transistor 60 is disposed an apex of the second integral subpixel area 10-2. Optionally, an aperture area (e.g., subpixel area other than an area occupied by the switching thin film transistor and metal lines) in the first integral subpixel area 10-1 has a substantially mirror symmetry with respect to the axis of mirror symmetry 13 in plan view of the array of a plurality of subpixel areas, and an aperture area in the second integral subpixel area 10-2 has a substantially mirror symmetry with respect to the axis of mirror symmetry 13 in plan view of the array of a plurality of subpixel areas. Optionally, a light transmission area in the first integral subpixel area 10-1 has a substantially mirror symmetry with respect to the axis of mirror symmetry 13 in plan view of the array of a plurality of subpixel areas, and a light transmission area in the second integral subpixel area 10-2 has a substantially mirror symmetry with respect to the axis of mirror symmetry 13 in plan view of the array of a plurality of subpixel areas. Optionally, the light transmission areas of the first integral subpixel area 10-1 and the second integral subpixel area 10-2 have a substantially mirror symmetry with respect to the interface 14 between the first integral subpixel area 10-1 and the second integral subpixel area 10-2 in plan view of the array of a plurality of subpixel areas. Optionally, the aperture areas of the first integral subpixel area 10-1 and the second integral subpixel area 10-2 have a substantially mirror symmetry with respect to the interface 14 between the first integral subpixel area 10-1 and the second integral subpixel area 10-2 in plan view of the array of a plurality of subpixel areas.

Optionally, the first switching thin film transistor 50 has a structure which has a substantially mirror symmetry with respect to the axis of mirror symmetry 13 in plan view of the array of a plurality subpixel areas. For example, the first source electrode 50a and the first drain electrode 50b have a substantially mirror symmetry with respect to the axis of mirror symmetry 13 in plan view of the array of a plurality of subpixel areas. Optionally, the second switching thin film transistor 60 has a structure which has a substantially mirror symmetry with respect to the axis of mirror symmetry 13 in plan view of the array of a plurality of subpixel areas. For example, the second source electrode 60a and the second drain electrode 60b have a substantially mirror symmetry with respect to the axis of mirror symmetry 13 in plan view of the array of a plurality of subpixel areas. Optionally, the first switching thin film transistor 50 and the second switching thin film 3 transistor 60 have a substantially mirror symmetry with respect to the interface 14 between the first integral subpixel area 10-1 and the second integral subpixel area 10-2 in plan view of the array of a plurality of subpixel areas.

In another aspect, the present disclosure provides a liquid crystal display panel having a liquid crystal array substrate described herein. Optionally, the liquid crystal display panel further includes a color filter substrate facing the liquid crystal array substrate. In some embodiments, the color filter substrate includes an array of a plurality of color filter blocks corresponding to the array of a plurality of subpixel areas in the liquid crystal array substrate. Optionally, each of the plurality of color filter blocks has a substantially isosceles triangular shape having a substantially mirror symmetry with respect to an axis of mirror symmetry. Optionally, the axis of mirror symmetry of the color filter block substantially overlaps with that of the subpixel area (e.g., the axis of mirror symmetry 13 in FIG. 18). Optionally, the first half and the second half have a substantially mirror symmetry with respect to the axis of mirror symmetry in plan view of the array of the plurality of color filter blocks. The first half and the second half constitute an integral color filter block, light emitted from which are of a substantially the same color.

In some embodiments, the plurality of color filter blocks can be grouped into a plurality of pairs of adjacent color filter blocks. Optionally, each pair of adjacent color filter blocks includes a first integral color filter block and a second integral color filter block. The first integral color filter block and the second integral color filter block have a substantially mirror symmetry with respect to an interface between the first integral color filter block and the second integral color filter block. Optionally, the interface is substantially perpendicular to the axis of mirror symmetry of each of the plurality of color filter blocks. Optionally, each pair of adjacent color filter blocks has a substantially parallelogram shape. Bases of the first integral color filter block and the second integral color filter block abut each other.

Optionally, the plurality of color filter blocks can be grouped a plurality of pairs of adjacent color filter blocks accordingly to a different arrangement. Optionally, the first integral color filter block is on top of the second integral color filter block. Apexes of the first integral color filter block and the second integral color filter block abut each other. The first integral color filter block and the second integral color filter block have a substantially mirror symmetry with respect to the interface between the first integral color filter block and the second integral color filter block in plan view of the array of a plurality of color filter blocks.

Optionally, the first integral color filter block and the second integral color filter block in the substantially parallelogram shape are of a same color.

Optionally, the first integral color filter block and the second integral color filter block in the substantially parallelogram shape are of different colors.

In some embodiments, color filter blocks of a same color are consecutively arranged along a direction substantially parallel to the axis of mirror symmetry of each of the plurality of color filter blocks. In one example, the liquid crystal display panel includes a plurality of pixels, each of which including at least three subpixels. The array of color filler blocks includes a plurality of color filter layers of different colors; each of the plurality of color filter layers having a plurality of color filter units of a same color. Optionally, each of the plurality of pixels includes at least three color filter units of different colors. Optionally, the at least three color filter units of different colors in a same pixel are consecutively arranged along a direction substantially parallel to the interface between the first integral color filter block and the second integral color filter block. Optionally, a plurality of color filter units of a same color from different pixels are consecutively arranged in a direction substantially parallel to the axis of mirror symmetry of each of the plurality of color filter blocks.

In some embodiments, color filter blocks of a same color are consecutively arranged along a direction substantially parallel to a side of the substantially isosceles triangular shaped color filter block. In another example, the liquid crystal display panel includes a plurality of pixels, each of which including at least three subpixels. The array of color filter blocks includes a plurality of color filter layers of different colors; each of the plurality of color filter layers having a plurality of color filter units of a same color. Optionally, each of the plurality of pixels includes at least three color filter units of different colors. Optionally, the at least three color filter units of different colors in a same pixel are consecutively arranged along a direction substantially parallel to the interface between the first integral color filter block and the second integral color fiber block. Optionally, a plurality of color filter units of a same color from different pixels are consecutively arranged along the direction substantially parallel to a side of the substantially isosceles triangular shaped color filter block.

In some embodiments the liquid crystal display panel is a fringe field driven liquid crystal display panel, in which the liquid crystal layer is driven by a fringe electric field. Examples of fringe field driven liquid crystal display panel include, but are not limited to, an advanced super-dimensional switching (ADS) liquid crystal display panel, an in-plane switch (IPS) liquid crystal display panel, and a fringe field switching (FFS) liquid crystal display panel.

In the present liquid crystal display panel, a pair of adjacent subpixels constitutes a parallelogram. Pixel electrodes in a pair of adjacent subpixels have 4N domains (N is an integer ≥1), e.g., four domains, each of the adjacent subpixels has 2N domains, e.g., two domains. The 4N domains exhibit mirror symmetry with respect to an axis of mirror symmetry of the subpixel and with respect to an interface between adjacent subpixels in the pair. Accordingly, color shift in the 4N domain compensates each other no matter along which viewing angle the display panel is viewed. Moreover, unlike the subpixels in conventional liquid crystal display panels which are arranged in stripes, the subpixels in the present liquid crystal display panel are not made of a rectangular shape, and are made interleaving each other. The vertical line defects and horizontal line defects observed in the conventional liquid crystal display panel can be substantially reduced or eliminated.

In some embodiments, the liquid crystal display panel further includes a plurality of switching thin film transistors, each of which in one of the plurality of subpixels. Each of the plurality of switching thin film transistors includes an active layer, a gate electrode connected to a gate line, a drain electrode connected to a pixel electrode, and a source electrode connected to a data line. Each of the plurality of switching thin film transistors is configured to control light emission in one of the plurality of subpixels. In some embodiments, the pair of adjacent subpixels in the liquid crystal display panel includes a first integral pixel electrode in the first subpixel, a second integral pixel electrode in the second subpixel, a first switching thin film transistor associated with the first integral pixel electrode, and a second switching thin film transistor associated with the second integral pixel electrode. The first switching thin film transistor includes a first source electrode connected to one of the plurality of second signal lines (e.g., in an example in which the second signal line is a data line), and a first drain electrode connected to the first integral pixel electrode. The second switching thin film transistor includes a second source electrode connected to one of the plurality of second signal lines (e.g., in an example in which the second signal line is a data line), and a second drain electrode connected to the second integral pixel electrode. The first integral pixel electrode and the second integral pixel electrode have a substantially mirror symmetry with respect to the interface between the first subpixel and the second subpixel in plan view of the array of a plurality of subpixels. Optionally, each pair of adjacent pixel electrodes has a substantially parallelogram shape. Bases of the first integral pixel electrode and the second integral pixel electrode abut each other.

In some embodiments, the first switching thin film transistor is disposed an apex of the first subpixel, and the second switching thin film transistor is disposed an apex of the second subpixel. Optionally, an aperture area (e.g., subpixel area other than an area occupied by the switching thin film transistor and metal lines) in the first subpixel has a substantially mirror symmetry with respect to the axis of mirror symmetry in plan view of the array of a plurality of subpixels, and an aperture area in the second subpixel has a substantially mirror symmetry with respect to the axis of mirror symmetry in plan view of the array of a plurality subpixels. Optionally, a light transmission area in the first subpixel has a substantially mirror symmetry with respect to the axis of mirror symmetry in plan view of the array of a plurality of subpixels, and a light transmission area in the second subpixel has a substantially mirror symmetry with respect to the axis of mirror symmetry in plan view of the array of a plurality of subpixels. Optionally, the light transmission areas of the first subpixel and the second subpixel have a substantially mirror symmetry with respect to the interface between the first subpixel and the second subpixel in plan view of the array of a plurality of subpixels. Optionally, the aperture areas of the first subpixel and the second subpixel have a substantially mirror symmetry with respect to the interface between the first subpixel and the second subpixel in plan view of the array of a plurality of subpixels.

Optionally, the first switching thin film transistor has a structure which has a substantially mirror symmetry with respect to the axis of mirror symmetry in plan view of the array of a plurality of subpixels. For example, the first source electrode and the first drain electrode have a substantially mirror symmetry with respect to the axis of mirror symmetry in plan view of the array of a plurality of subpixels. Optionally, the second switching thin film transistor has a structure which has a substantially mirror symmetry with respect to the axis of mirror symmetry in plan view of the array of a plurality of subpixels. For example, the second source electrode and the second drain electrode have a substantially mirror symmetry with respect to the axis of mirror symmetry in plan view of the array of a plurality of subpixels. Optionally, the first switching thin film transistor and the second switching thin film transistor have a substantially mirror symmetry with respect to the interface between the first subpixel and the second subpixel in plan view of the array of a plurality of subpixels.

In another aspect, the present disclosure provides a color filter substrate. In some embodiments, the color filter substrate includes an array of a plurality of color filter blocks. Optionally, each of the plurality of color filter blocks has a substantially isosceles triangular shape; the plurality of color filter blocks are grouped into a plurality of pairs of adjacent color filter blocks; and each of the plurality of pairs of adjacent color filter blocks has a substantially parallelogram shape. Optionally, each of the plurality of pairs of adjacent color filter blocks in the substantially parallelogram shape are of a same color. Optionally, each of the plurality of pairs of adjacent color filter blocks in the substantially parallelogram shape are of different colors.

In some embodiments, each of the plurality of color filter blocks has a substantially isosceles triangular shape having a substantially mirror symmetry with respect to an axis of mirror symmetry of the substantially isosceles triangular shape. Optionally, each of the plurality of color filter blocks includes a first half and a second half have a substantially mirror symmetry with respect, to the axis of mirror symmetry in plan view of the array of the plurality of color filter blocks. The first half and the second half constitute an integral color filter block, light emitted from which are of a substantially the same color.

In some embodiments, the plurality of color filter blocks are grouped into a plurality of pairs of adjacent color filter blocks. Optionally, each of the plurality of pairs of adjacent color filter blocks includes first integral color filter block and a second integral color filter block having a substantially mirror symmetry with respect to an interface between the first integral color filter block and the second integral color filter block in plan view of the array of a plurality of color filter blocks, the interface being substantially perpendicular to the axis of mirror symmetry of the each of the plurality of color filter blocks. Optionally, each of the plurality of pairs of adjacent color filter blocks has a substantially parallelogram shape.

Optionally, color filter blocks of a same color are consecutively along a direction substantially parallel to the axis of mirror symmetry. Optionally, color filter blocks of a same color are consecutively along a direction substantially parallel to a side of the substantially isosceles triangular shape.

In another aspect, the present disclosure provides a liquid crystal display apparatus having a liquid crystal display panel described herein. Examples of appropriate liquid crystal display apparatuses includes, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It as not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal array substrate comprising an array of a plurality of subpixel areas, comprising:
    a plurality of first signal lines and a plurality of second signal lines crossing over each other; and
    a plurality of pixel electrodes corresponding to the plurality of subpixel areas, each of the plurality of subpixel areas comprising a single one of the plurality of pixel electrodes, and the single one of the plurality of pixel electrodes in each of the plurality of subpixel areas being an integral pixel electrode;
    wherein each of the plurality of subpixel areas comprises a first subarea and a second subarea having a substantially mirror symmetry with respect to a plane of mirror symmetry containing one of the plurality of second signal lines in plan view of the array of the plurality of subpixel areas; and
    the first subarea and the second subarea constitute an integral subpixel area, the integral pixel electrode being controlled by a single switching thin film transistor;
    wherein the plurality of subpixel areas are grouped into a plurality of pairs of adjacent subpixel areas; and
    each of the plurality of pairs of adjacent subpixel areas comprises a first integral subpixel area and a second integral subpixel area having a substantially mirror symmetry with respect to a plane of mirror symmetry containing one of the plurality of first signal lines in plan view of the array of a plurality of subpixel areas.

2. The liquid crystal array substrate of claim 1, wherein the integral pixel electrode comprises a plurality of domains having a substantially mirror symmetry with respect to the plane of mirror symmetry containing the one of the plurality of second signal lines in plan view of the array of a plurality of subpixel areas.

3. The liquid crystal array substrate of claim 2, wherein the plurality of domains comprise a first domain and a second domain; and
    the integral pixel electrode comprises a plurality of first branches in the first domain and a plurality of second branches in the second domain, the plurality of first branches and the plurality of second branches having a substantially mirror symmetry with respect to the plane of mirror symmetry containing the one of the plurality of second signal lines in plan view of the array of a plurality of subpixel areas.

4. The liquid crystal array substrate of claim 1, wherein the integral subpixel area has a substantially triangular shaped cross-section, a base of which abutting one of the plurality of first signal lines.

5. The liquid crystal array substrate of claim 1, wherein the plurality of pixel electrodes comprise a first integral pixel electrode in the first integral subpixel area and a second integral pixel electrode in the second integral subpixel area;
    a plurality of domains in the first integral pixel electrode have a substantially mirror symmetry with respect to the plane of mirror symmetry containing the one of the plurality of second signal lines in plan view of the array of a plurality of subpixel areas;
    a plurality of domains in the second integral pixel electrode have a substantially mirror symmetry with respect to the plane of mirror symmetry containing the one of the plurality of second signal lines in plan view of the array of a plurality of subpixel areas; and
    the plurality of domains in the first integral pixel electrode are substantially mirror symmetrical to the plurality of domains in the second integral pixel electrode with respect to one of the plurality of first signal lines in plan view of the array of a plurality of subpixel areas.

6. The liquid crystal array substrate of claim 5, wherein the plurality of domains in the first integral pixel electrode comprise a first domain and a second domain;
    the plurality of domains in the second integral pixel electrode comprise a third domain and a fourth domain;
    the first integral pixel electrode comprises a plurality of first branches in the first domain and a plurality of second branches in the second domain, the plurality of first branches and the plurality of second branches having a substantially mirror symmetry with respect to the plane of mirror symmetry containing the one of the plurality of second signal lines in plan view of the array of a plurality of subpixel areas;
    the second integral pixel electrode comprises a plurality of third branches in the third domain and a plurality of fourth branches in the fourth domain, the plurality of third branches and the plurality of fourth branches having a substantially mirror symmetry with respect to the plane of mirror symmetry containing the one of the plurality of second signal lines in plan view of the array of a plurality of subpixel areas; and
    the plurality of first branches and the plurality of second branches are substantially mirror symmetrical to the plurality of third branches and the plurality of fourth branches with respect to the one of the plurality of first signal lines in plan view of the array of a plurality of subpixel areas.

7. The liquid crystal array substrate of claim 1, further comprising a plurality of switching thin film transistors, each of which in one of the plurality of subpixel areas;
   each of the plurality of pairs of adjacent subpixel areas comprises a first integral pixel electrode in the first integral subpixel area, a second integral pixel electrode in the second integral subpixel area, a first switching thin film transistor associated with the first integral pixel electrode, and a second switching thin film transistor associated with the second integral pixel electrode;
   the first switching thin film transistor has a structure which has a substantially mirror symmetry with respect to the plane of mirror symmetry containing the one of the plurality of second signal lines in plan view of the array of a plurality of subpixel areas;
   the second switching thin film transistor has a structure which has a substantially mirror symmetry with respect to the plane of mirror symmetry containing the one of the plurality of second signal lines in plan view of the array of a plurality of subpixel areas;
   a light transmission area in the first integral subpixel area has a substantially mirror symmetry with respect to the plane of mirror symmetry containing the one of the plurality of second signal lines in plan view of the array of a plurality of subpixel areas; and
   a light transmission area in the second integral subpixel area has a substantially mirror symmetry with respect to the plane of mirror symmetry containing the one of the plurality of second signal lines in plan view of the array of a plurality of subpixel areas.

8. A liquid crystal display panel, comprising the liquid crystal array substrate of claim 1.

9. The liquid crystal display panel of claim 8, further comprising a color filter substrate facing the liquid crystal array substrate;
   wherein the color filter substrate comprising an array of a plurality of color filter blocks, corresponding to the array of a plurality of subpixel areas in the liquid crystal array substrate;
   each of the plurality of color filter blocks comprises a first half and a second half having a substantially mirror symmetry with respect to the plane of mirror symmetry containing the one of the plurality of second signal lines in plan view of the array of the plurality of color filter blocks; and
   the first half and the second half constitute an integral color filter block, light emitted from which are of a substantially the same color.

10. A liquid crystal array substrate comprising an array of a plurality of subpixel areas, comprising:
   a plurality of pixel electrodes corresponding to the plurality of subpixel areas, each of the plurality of subpixel areas comprising a single one of the plurality of pixel electrodes, and the single one of the plurality of pixel electrodes in each of the plurality of subpixel areas being an integral pixel electrode;
   wherein each of the plurality of subpixel areas has a substantially isosceles triangular shaped cross-section having a substantially mirror symmetry with respect to an axis of mirror symmetry; and
   each of the plurality of subpixel areas comprises a first subarea and a second subarea have a substantially mirror symmetry with respect to the axis of mirror symmetry in plan view of the array of the plurality of subpixel areas; and
   the first subarea and the second subarea constitute an integral subpixel area, the integral pixel electrode being controlled by a single switching thin film transistor;
   wherein the plurality of subpixel areas are grouped into a plurality of pairs of adjacent subpixel areas; and
   each of the plurality of pairs of adjacent subpixel areas comprises a first integral subpixel area and a second integral subpixel area having a substantially mirror symmetry with respect to an interface between the first integral subpixel area and the second integral subpixel area in plan view of the array of a plurality of subpixel areas, the interface being substantially perpendicular to the axis of mirror symmetry.

11. The liquid crystal array substrate of claim 10, wherein the integral pixel electrode comprises a plurality of domains having a substantially mirror symmetry with respect to the axis of mirror symmetry in plan view of the array of a plurality of subpixel areas.

12. The liquid crystal array substrate of claim 11, wherein the plurality of domains comprise a first domain and a second domain; and
   the integral pixel electrode comprises a plurality of first branches in the first domain and a plurality of second branches in the second domain, the plurality of first branches and the plurality of second branches having a substantially mirror symmetry with respect to the axis of mirror symmetry in plan view of the array of a plurality of subpixel areas.

13. The liquid crystal array substrate of claim 10, wherein the plurality of pixel electrodes comprise a first integral pixel electrode in the first integral subpixel area and a second integral pixel electrode in the second integral subpixel area;
   a plurality of domains in the first integral pixel electrode have a substantially mirror symmetry with respect to the axis of mirror symmetry in plan view of the array of a plurality of subpixel areas;
   a plurality of domains in the second integral pixel electrode have a substantially mirror symmetry with respect to the axis of mirror symmetry in plan view of the array of a plurality of subpixel areas; and
   the plurality of domains in the first integral pixel electrode are substantially mirror symmetrical to the plurality of domains in the second integral pixel electrode with respect to the interface in plan view of the array of a plurality of subpixel areas.

14. The liquid crystal array substrate of claim 13, wherein the plurality of domains in the first integral pixel electrode comprise a first domain and a second domain;
   the plurality of domains in the second integral pixel electrode comprise a third domain and a fourth domain;
   the first integral pixel electrode comprises a plurality of first branches in the first domain and a plurality of second branches in the second domain, the plurality of first branches and the plurality of second branches having a substantially mirror symmetry with respect to the axis of mirror symmetry in plan view of the array of a plurality of subpixel areas;
   the second integral pixel electrode comprises a plurality of third branches in the third domain and a plurality of fourth branches in the fourth domain, the plurality of third branches and the plurality of fourth branches having a substantially mirror symmetry with respect to the axis of mirror symmetry in plan view of the array of a plurality of subpixel areas; and
   the plurality of first branches and the plurality of second branches are substantially mirror symmetrical to the plurality of third branches and the plurality of fourth branches with respect to the interface in plan view of the array of a plurality of subpixel areas.

15. The liquid crystal array substrate of claim 10, further comprising a plurality of switching thin film transistors, each of which in one of the plurality of subpixel areas;

each of the plurality of pairs of adjacent subpixel areas comprises a first integral pixel electrode in the first integral subpixel area, a second integral pixel electrode in the second integral subpixel area, a first switching thin film transistor associated with the first integral pixel electrode, and a second switching thin film transistor associated with the second integral pixel electrode;

the first switching thin film transistor has a structure which has a substantially mirror symmetry with respect to the axis of mirror symmetry in plan view of the array of a plurality of subpixel areas;

the second switching thin film transistor has a structure which has a substantially mirror symmetry with respect to the axis of mirror symmetry in plan view of the array of a plurality of subpixel areas;

a light transmission area in the first integral subpixel area has a substantially mirror symmetry with respect to the axis of mirror symmetry in plan view of the array of a plurality of subpixel areas; and a light transmission area in the second integral subpixel area has a substantially mirror symmetry with respect to the axis of mirror symmetry in plan view of the array of a plurality of subpixel areas.

16. A liquid crystal display panel, comprising the liquid crystal array substrate of claim 10.

17. The liquid crystal display panel of claim 16, further comprising a color filter substrate facing the liquid crystal array substrate;

wherein the color filter substrate comprising an array of a plurality of color filter blocks, corresponding to the array of a plurality of subpixel areas in the liquid crystal array substrate;

each of the plurality of color filter blocks has a substantially isosceles triangular shape having a substantially mirror symmetry with respect to an axis of mirror symmetry;

each of the plurality of color filter blocks comprises a first half and a second half having a substantially mirror symmetry with respect to the axis of mirror symmetry in plan view of the array of the plurality of color filter blocks; and the first half and the second half constitute an integral color filter block, light emitted from which are of a substantially the same color.

* * * * *